United States Patent [19]

Campbell et al.

[11] 4,087,852

[45] May 2, 1978

[54] MICROPROCESSOR FOR AN AUTOMATIC WORD-PROCESSING SYSTEM

[75] Inventors: Kenneth C. Campbell, Dallas; Werner Schaer, Richardson; Harry W. Swanstrom, Dallas, all of Tex.

[73] Assignee: Xerox Corporation, Stamford, Conn.

[21] Appl. No.: 430,130

[22] Filed: Jan. 2, 1974

[51] Int. Cl.² ........................ G06F 9/20; G06F 3/00

[52] U.S. Cl. ........................ 364/200

[58] Field of Search ........................ 340/172.5; 444/1; 364/200 MS File, 900 MS File

[56] References Cited

U.S. PATENT DOCUMENTS

| | | | |
|---|---|---|---|
| 3,614,741 | 10/1971 | McFarland | 340/172.5 |
| 3,614,746 | 10/1971 | Klinkhamer | 340/172.5 |
| 3,634,882 | 1/1972 | McIlroy | 444/1 |
| 3,657,705 | 4/1972 | Mekota et al. | 340/172.5 |
| 3,764,996 | 10/1973 | Ross | 340/172.5 |
| 3,778,780 | 12/1973 | Moore | 340/172.5 |

*Primary Examiner*—Mark E. Nusbaum

[57] ABSTRACT

The keyboard, printer and recording means are peripheral units under the control of a microprocessor including a programmable read-only memory from which appropriate control instructions are derived. Control signal sequences for operating the word processing system are the result of addressing of the read-only memory in accordance with the sensed status of the attached peripheral units and a priority schedule. The peripheral units operate semiautomatically in response to control instructions to execute a commanded function.

Control instructions fall into various classes for controlling peripherals, determining the status of peripherals or performing internal operations within the microprocessor. The format of the next address or sequence of addresses to be applied to the read-only memory is dependent on the class of the prior control instruction or the response of a peripheral unit to a particular control signal.

12 Claims, 37 Drawing Figures

| | |
|---|---|
| 0000 | M-G = Ø |
| 0001 | M=G |
| 0010 | M·G = Ø |
| 0011 | M=Ø |
| 0100 | M=M-1=0 |
| 0101 | M-G = M>Ø |
| 0110 | M+G = M |
| 0111 | (M=Ø)' |

| | | |
|---|---|---|
| 1000 | M=(M-XX)' | 8 |
| 1001 | M= XX-M | 9 |
| 1010 | M= M+XX | A |
| 1011 | NOT USED | B |
| 1100 | M= M*XX | C |
| 1011 | M= M·XX | D |
| 1110 | M= M@XX | E |
| 1111 | M=XX | F |

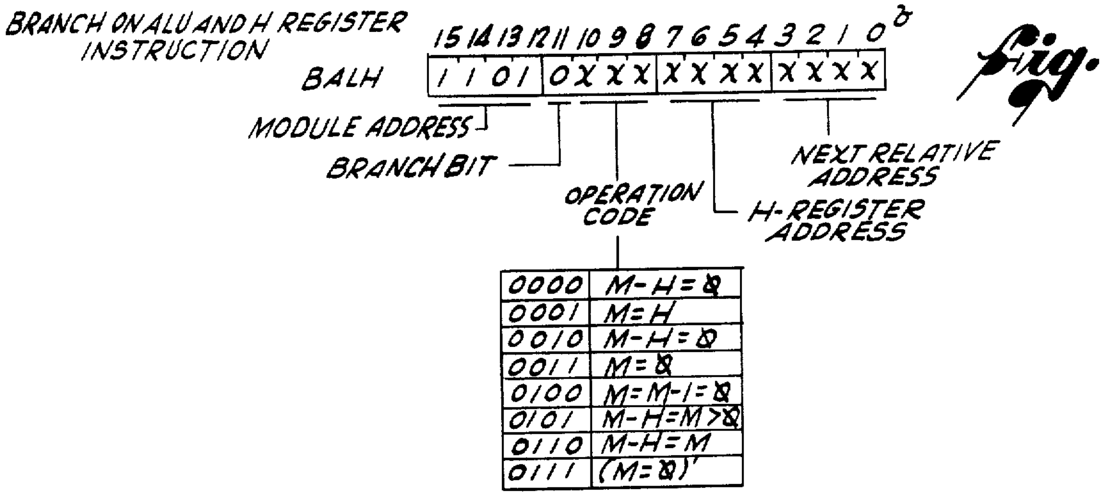

Fig. 16

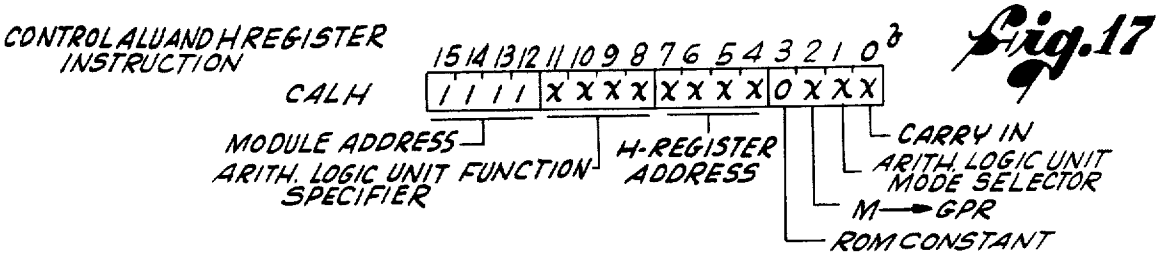

Fig. 17

Fig. 16a

| | OPERATION CODE | | CALG / CALH (FUNCTION SPECIFIER) | | | |
|---|---|---|---|---|---|---|
| | BALG/BALH | ROM CONSTANT=1 CALR | ALU MODE SELECTOR = 1 | CARRY IN = 1 | M → GPR = 1 | NOTHING SET |
| 0 0 0 0 | M - GX = ∅ | M = M - XX | $M = \overline{M}$ | | GX = M | M = M - 1 |
| 0 0 0 1 | M = GX | M = XX - M | $M = \overline{M \wedge GX}$ | | GX = ∅ | |
| 0 0 1 0 | M ∧ GX = ∅ | M = M + XX | $M = \overline{M} + GX$ | | | |
| 0 0 1 1 | M = ∅ | | | | | |
| 0 1 0 0 | M - 1 = M = ∅ | M = M ⊻ XX | $M = \overline{M + GX}$ | | | |
| 0 1 0 1 | M - GX = M > ∅ | M = M ∧ XX | $M = \overline{GX}$ | | | |
| 0 1 1 0 | M + GX = M; TC | M = M ∨ XX | $M = M \wedge \overline{GX}$ | M = M - GX | | |
| 0 1 1 1 | M ≠ ∅ | M = XX | $M = M \vee \overline{GX}$ | | | |
| 1 0 0 0 | | | $M = \overline{M} \wedge GX$ | | | |
| 1 0 0 1 | | | M = M ⊻ GX | M = M + GX + 1 | | |
| 1 0 1 0 | | | M = GX | | | |
| 1 0 1 1 | | | M = M ∨ GX | | | |
| 1 1 0 0 | | | | R MAR REL | | S MAR REL |
| 1 1 0 1 | | | $M = M \wedge \overline{GX}$ | | | |
| 1 1 1 0 | | | M = M ∧ GX | | | |
| 1 1 1 1 | | | | M = M + 1 | | |

MICROPROCESSOR FOR AN AUTOMATIC WORD-PROCESSING SYSTEM

BACKGROUND OF THE INVENTION (1) Field of the Invention

The present invention relates generally to automatic word processing systems and more particularly to such a system under the control of a microprocessor incorporating a programmable read-only memory.

(2) Description of the Prior Art

There are numerous examples of automatic typewriting systems in the prior art all of which exhibit certain common characteristics. In particular, the equivalent of a typewriter keyboard is used as an input device with the typed characters simultaneously being printed and stored in a recording means. Typically, the entered data will either have to be duplicated many times or there will be substantial corrections in the final copy and hence the purpose for recording the typed characters is to permit the material to be printed under operator control at a considerably increased speed. Typically, numerous rates of replay control are provided so that the operator may duplicate unchanged portions of text at high speed and then playback portions to be corrected more slowly on a word by word, or character by character basis. Normally, some means is provided to rerecord the data, together with the corrections and revisions so that a final copy may be played back and printed at high speed without further revision.

In the past, such word processing systems have had certain drawbacks. In particular, a modified conventional typewriter has been used as the keyboard and printer which limited, in some instances, the output format and the speed of operation. Additionally, when revised textual material was being printed, elaborate precautions normally had to be taken in order to prevent the right margin being reached in the middle of a word.

In particular, numerous words were normally hyphenated so that the machine could execute a carriage return when the hyphen was reached and not the unhyphenated middle of a word. While unnecessary hyphens were not printed out on the final copy, much time and effort was expended in originally inserting them to prevent encountering problems at the right margin of a line. Numerous attempts have been made to modify equipment mainly intended for manual operation in order for use in automatic word processing systems. While these prior art systems are workable, full advantage is not taken of the speed of the automatic portions of such systems.

Thus, there has long been a need in the field of automatic word-processing systems for an integrated input-output and control system which would be more fully automatic in operation and take more full advantage of the automatic processing portion of the system to eliminate as much operator intervention as possible. The present invention satisfies that need.

SUMMARY OF THE INVENTION

The automatic word-processing system of the present invention provides significant improvements over prior art systems in that the peripheral devices such as keyboards, printers, buffers and tape recorders operate semiautonomously and communicate with a central processing unit with relatively simple control signals which indicate the operating status of the peripherals. Thus, a central processing unit of moderate size, such as a micro-process or incorporating a programmable read-only memory (ROM) may be used, not only provide control interfacing between the peripherals, but provide a level of automatic word processing normally unattainable with such relatively low levels of complexity.

In a presently preferred embodiment of the invention a keyboard data entry unit is independent of the data output printing unit. Entered data passes through the central processing unit before being printed and recorded so that coding changes and the like may be easily effected. When quantities of data are to be duplicated on another recording means, the printer and keyboard are bypassed to greatly increase the duplication rate. The duplication may then be stopped at a point where correction is necessary.

A particular feature of the invention is that, when revised recorded material is played back to be printed, the right margin is controlled so that each line ends in a grammatically proper manner. In this respect, when a right margin zone is reached during printing, all characters which may fall within that margin zone are sequentially examined for particular special characteristics which can be used to terminate the line. For example, if a space is sensed within the margin zone the line is terminated at that point. Similarly, if a hyphen within a word is sensed, the line is also terminated. However, if none of the characters within the margin zone can be used to terminate the line, printing is stopped and the operator of the machine is alerted. The operator can then determine on a character by character basis where to terminate the line, usually by means of a hyphen between syllables in a single word.

Similarly, when the word processing system of the present invention is operating between the left margin and the margin zone, designated as the text zone, original line terminations should not be executed. For example, if a carriage return should appear within the text zone because it was needed in the original unrevised text, it would be inappropriate to execute the carriage return in the text zone of the revised material. Therefore, within the text zone, a carriage return is changed to a space and the space is executed. Similarly, other inappropriate control characters such as an unnecessary hyphen is eliminated. There are, however, control characters which must be executed regardless of their position within a line. For example a PRECEDENTED hyphen which cannot be ignored within a word is executed. Similarly, a carriage return followed by a tab indicating a new paragraph is also executed.

Thus, within the text zone all control characters are examined to see if they are appropriate and either changed to a more appropriate control character, or executed, as necessary.

Another feature of the word processing system of the present invention is the technique by which address words for the ROM are formed. In this respect, the addresses normally supplied to the ROM are sequential in nature with the address being incremented by one for each process cycle. However, the character of the control instruction stored at that address may inherently completely change the next address to the ROM or the address to the ROM may be changed depending upon the status of a particular peripheral device which responds to the previous control word. For example, a ROM control word corresponding to a particular ROM address may inquire as to the readiness to receive data of a particular peripheral. If the peripheral is not ready to receive data, the ROM address may be simply incremented by one and the next ROM control word generated in a general control or idle sequence. But, if the peripheral is ready, a returning status signal from that peripheral conditions a ROM address register to completely change the next ROM address to BRANCH to a different sequence of ROM control words to execute a particular operation based on the status of the peripheral. The BRANCH is made within a predetermined set of ROM addresses to a next relative address.

Typically a BRANCH may call for the execution of a sequence of instructions within the limits of the next relative address or for a JUMP to a completely independent instruction. A JUMP may be unconditional or in a JUMP and RETURN operation, the previous ROM address word is stored in a return address stack and, after the JUMP address sequence is completed, the sequence returns to the original stored ROM address word to continue from that point. Thus, the control or idle ROM address sequence is provided with a number of BRANCH or JUMP sequences or subroutines to perform particular control tasks as needed.

In general, in addition, the word processing system of the present invention utilizes a printer having the capability of executing relatively general input commands in that it can execute differential positional commands under electronic control rather than the fixed mechanical movements of prior art machines. To this end, the central processing unit is capable of executing commands for variable spacing, for example, which can be executed by the printer. The printer employs a unique disc having peripheral characters which is considerably faster than prior art printing systems in that motion in only one axis is required rather than multiple axis motion required for the prior art systems.

However, as noted above, the printer is a relatively semiautonomous unit and the only input required is a single character word to be printed. In a version of the word processing system of the present invention, additional information relating to the spacing for that particular character is also generated by the central processing unit and sent to the printer.

In the printer of the present invention, the ribbon is closely spaced between the paper and the character disc normally obscuring the operator's view of the printed characters. Thus, an additional feature in the printer of the present invention is a ribbon tilt control system which automatically moves the ribbon out of the line of sight under two different circumstances. In the first, the ribbon may be manually tilted by the operator. In the second circumstance the ribbon is automatically tilted whenever the operator ceases using the keyboard for a given predetermined time period.

Thus, the word processing system of the present invention provides a significantly improved form of operation in that the processing capability of the central processing unit is greatly expanded by providing semiautonomous peripheral devices which accept relatively simple coded instructions for execution and signals its status by a relatively simple return control signal to the central processing unit. In addition, the printer used with the system has considerably expanded capabilities with respect to speed of printout and format of printout.

DESCRIPTION OF THE DRAWINGS

FIG. 16 is a tabular presentation of the format of the branch on ALU and H register;

FIG. 16*a* is a tabulation of the functional operations which may be performed by the arithmetic logic unit incorporated into the microprocessor of the present invention;

FIG. 17 is a tabular presentation of the format of the control ALU and H register instruction;

DESCRIPTION OF THE PREFERRED EMBODIMENT

Introduction

Figure 1:
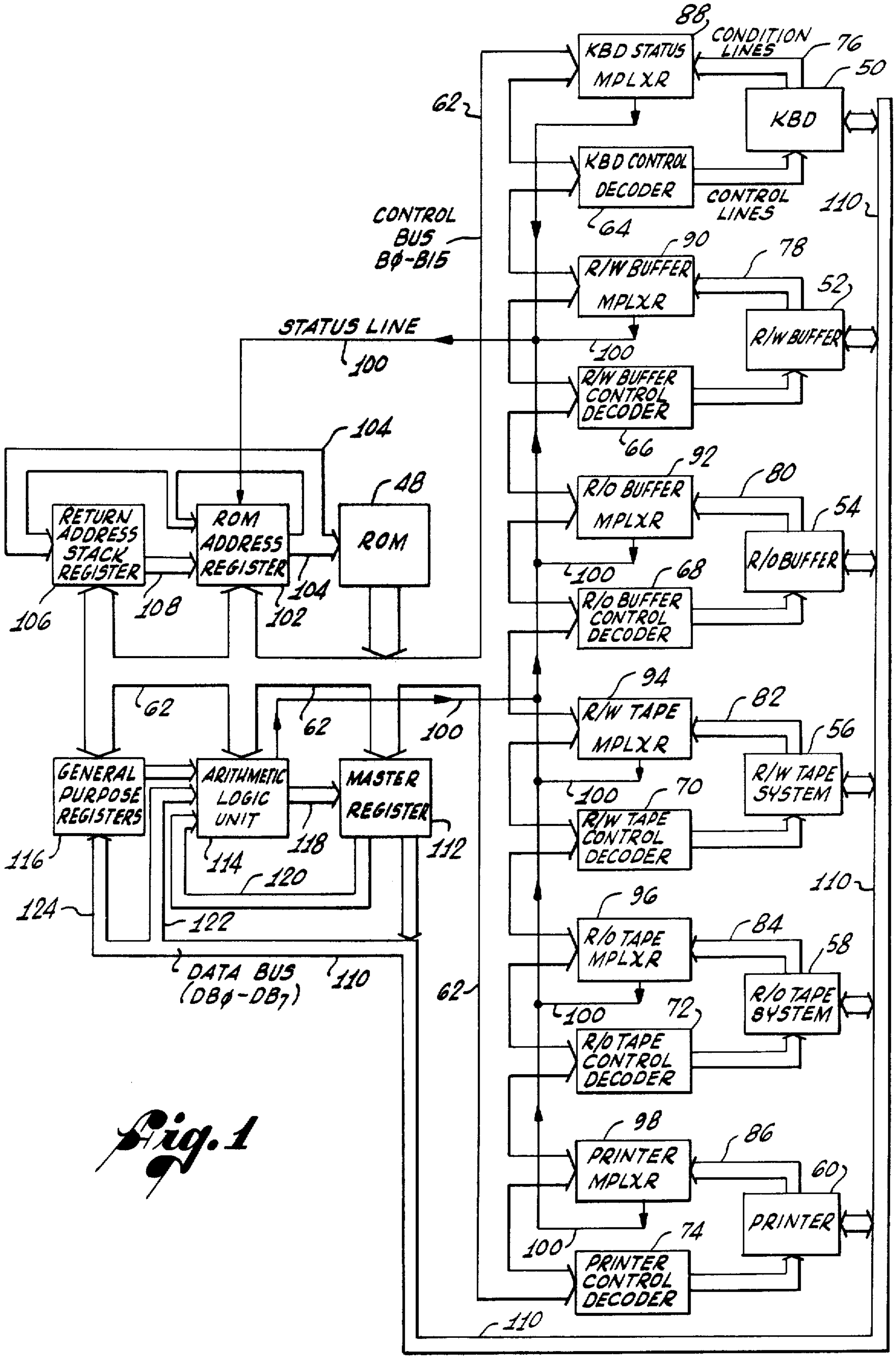
FIG. 1 is an overall block diagram of the word processing system of the present invention.

The automatic word processing system of the present invention includes a keyboard data input unit with an associated serial printer which are physically combined to resemble a conventional typewriter. While the keyboard and printer are not mechanically linked, there is no perceptible delay between keyboard entries and resultant printing of characters as they are processed through the system.

Keyboard entries are substantially processed and both stored temporarily in a buffer memory and sent to the printer. Any changes in the text within a line of text results in the correction of the material stored in the buffer memory. At the end of a line of text, the carriage return character (CR) causes the dumping of the contents of the buffer memory onto a magnetic tape recording means.

During the data entry or record modes, the operator has the ability to correct various kinds of errors. If the error to be corrected occurs during the line of text then being entered, the backspace function will equivalently backspace and erase the buffer memory and a new character recorded over the error. If the error occurs on a previous line, the magnetic tape may be rewound one line length and all data from that point must be recorded. To facilitate later corrections in a playback mode, the equivalent of 50 blank characters are added to the end of each line as it is recorded on the tape.

In a PLAY mode, keyboard control characters permit typing paragraphs, lines, words or individual characters with the machine automatically stopping after the selected segment. Thus, if nothing is to be changed within a particular paragraph, a PARAGRAPH control button is depressed and that entire paragraph is printed out before the machine stops. If a correction is to be inserted in the middle of a paragraph, the LINE button is depressed sequentially as each line is printed. When the line containing a correction is reached, a WORD or CHARACTER/STOP button is pushed with the machine stopping after each word or character, respectively, is printed until the point where the correction is to be made is reached. At that point, the correction is inserted and the appropriate button is pushed to continue the operation. Deletions can be made in a similar manner by depressing a combination of controls such as SKIP and WORD.

In a mode called DUPLICATE, the correct text is recorded onto a second tape at relatively high speed without printing. Because the printer is operated independently of the tape drives and processor, long passages of correct data may be duplicated without printing at high speed onto the second tape without the data being printed. The section of text to be corrected is reached by suitable use of the AUTO, PARAGRAPH and LINE control buttons. Therefore the duplication process need only be stopped when a correction is to be made. The duplication speed is then reduced to the speed of the printer. After corrections are made, the duplication speed may be again increased for correct text and the printer bypassed.

A REVISE mode permits making corrections or insertions without recording the second tape. The tape is again played out at high speed until the section of text to be corrected is reached. The incorrect line may then be retyped with a limit of fifty characters added to each line. More than one line may be used but the entries in each must be retyped. In REVISE, the fifty additional characters per line are not added at the end of the recorded line.

Basic System

The presently preferred embodiment of the system of the invention operates substantially as a special purpose computer in that a programmable read-only-memory (ROM) 48 (FIG. 1) is utilized to control the operation of the machine. However, the ROM does not completely control the machine however, and there are relatively autonomous peripheral devices such as the tape systems, which accepts instructions from the ROM and then may perform its own sequential steps to execute that instruction. There is substantially a two-way communication between each of the peripherals and the central processing unit called the microprocessor. The operation of the peripheral systems is fully described in a copending applications, Ser. No. 429,479 and will not be described further herein.

Basically the operation of the machine is illustrated in the block diagram of FIG. 1. The peripheral devices are a keyboard (KBD) 50, a read-write (R/W) buffer 52, a read only (R/O) buffer 54, a read-write (R/W) tape system 56, a read only (R/O) tape system 58 and a printer 60. All of the peripheral devices are controlled by a sixteen bit control bus 62 which is connected in parallel with all of the peripherals. In order to control particular peripherals, each is provided with a decoder 64–74 consisting of conventional logic gates to sense control words on the control bus 62 appropriate to the particular peripheral device. The peripheral then performs its individual functions and its condition at any particular time is monitored by means of a number of condition lines 76–86 which enter a status multiplexer 88–98 for each device. The multiplexers 88–98 are also controlled by the sixteen bit control bus 62. The multiplexers 88–98 have a single status line 100 output all of which are tied together as a single status line. Which peripheral is being interrogated and which condition of that peripheral is determined by the control signals on the control bus 62 and the status line 100 merely provides a YES or a NO answer to that interrogation. The significance of the YES or NO is a function of the control signal itself. Typically, the condition of the status line indicates that the ROM will either continue to be sequentially addressed or BRANCH to a new sequence of addresses depending on the "status" of the particular peripheral.

The ROM 48 itself in the illustrated presently preferred embodiment has a sixteen bit output ($b_0$–$b_{15}$) and an 12-bit input ($A_0$–$A_{11}$) which can generate a total of 4,096 control instructions. The inputs and outputs are completely specified beforehand and are hard wired or "programmed" into the ROM itself. The ROM 48 is addressed through a ROM address register 102 via address bus 104 and it should be appreciated that the instructions coming from the ROM may also determine what following address will be supplied to the ROM. Typically, the sequential steps provided by the ROM 48 may be changed by varying the address to the ROM through the ROM address register 102. Therefore, the ROM address register 102 has provision for a number of combination of inputs for various purposes. It is significant that the status line 100 is connected to the ROM address register 102. Thus, the address which is applied to the ROM 48 may be one address or another depending upon the condition of the status line.

Additionally, the ROM address register 102 may receive its new address from a return address stack register 106. For example, if in the middle of a particular sequence, an instruction indicates that an intermediate operation has to be performed before the sequence can continue, the address of the present instruction is stored in the return address stack register 106 and then the ROM address register 102 is changed through the control bus 62 to perform the interruptory sequence. When the interruptory sequence is completed, the ROM address register 102 receives the return address from the stack register 106 through return address bus 108 and then applies it to the ROM 48.

The entire operation of the machine is to operate upon data and a common eight bit data bus 110 is connected in parallel with all of the peripheral devices as well as a data processing equipment. A main register 112 is provided as a central receiving register for data signals. All entries into the main register 112 are made through an "arithmetic logic unit" 114 (hereinafter abbreviated ALU 114) which can pass the data or control signals straight through to the main register or can perform any of either different arithmetic or logic functions on the data as it passes through the arithmetic logic unit. The ALU 114 is simply a single or multiple chip designed to perform arithmetic and logic operations on applied digital data and adapted for use in the word processor of the present invention. Which of the arithmetic or logic operations is performed in the ALU 114 is again governed by the ROM control bus 62.

In addition, 32 general purpose registers 116 are provided and identified as the 16 G ($G_0$–$G_{15}$) registers and 16 H ($H_0$–$H_{15}$) registers. The general purpose registers 116 are available for temporary storage of data or control signals. Other data generally stored in the general purpose registers 116 is the tab count, positions, and mode signals among other common data for systems of this type. Also, a number of registers are reserved for keyboard overflow in the case that there are more keyboard characters coming in than can be processed. Also, a number of registers are left blank for general purpose storage during the processing or testing of characters or data.

Data signals on data bus 110 circulate through the ALU 114 and main register 112 to the general purpose registers 116 and interconnecting buses 118, 120, 122, 124 and 126 generally illustrate the data flow paths.

Multiplexers

Figure 2:
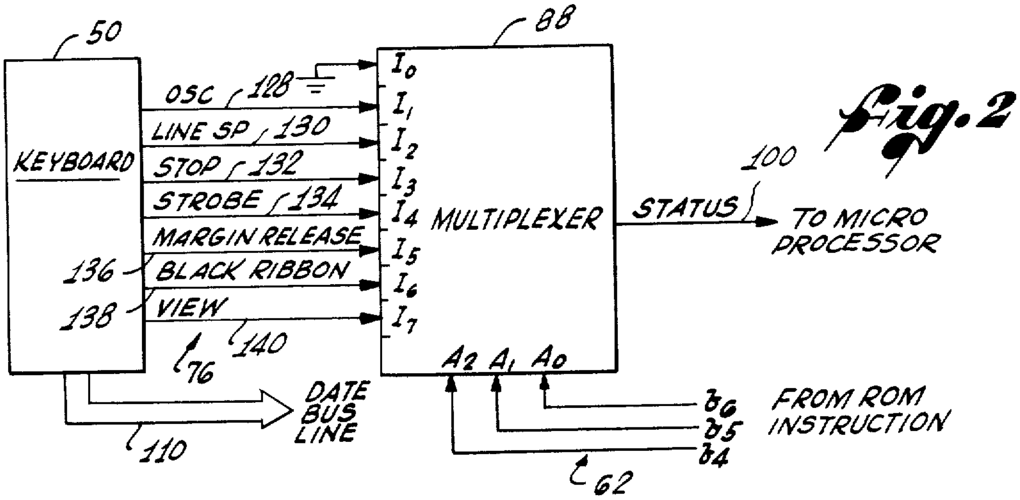
FIG. 2 is a block diagram of the technique for interrogating the keyboard as to its status.

FIG. 2 shows the general configuration of a multiplexer 88 used in the word processor. In this example, the keyboard 50 has a number of condition lines 76 which indicate its particular condition. In particular, there is a line 128 indicated that the audio warning oscillator (OSC) is on and there are also a line space 130 (LINE SP), a stop 132, a strobe 134 indicating that a character is ready to be processed, a margin release 136, ribbon color control 138 and a line called VIEW 140 which operates the ribbon tilt system briefly described above. In general, the eight condition lines 76 from the keyboard 50 are applied to the multiplexer 88, and which of the lines selected to be connected to the status line 100 is governed by bits $b_4$, $b_5$ and $b_6$ of the ROM instruction on the control bus 62. It should be noted that the keyboard multiplexer 88 is selected by means of other ROM instruction bits on the control bus 62 so that, for example, an entire instruction might be needed to check the status of the margin release line 136 of the keyboard 50. The 16-bit ROM instruction on the control bus 62 would then select the keyboard multiplexer 88 and select the proper arrangement of control signals on bits $b_4$, $b_5$ and $b_6$ to connect the margin release line 136 to the status line 100. If the status line 100 was at the correct level, the ROM address might then be continued onto the next sequential address or it may BRANCH to a different address to perform a different operation based on the margin release status condition.

FIG. *2a* illustrates the basic format for the keyboard status check instruction set. In particular, the keyboard "module" is addressed by means of bits $b_{12}$ through $b_{15}$ of the ROM instruction and, in the case of the keyboard 50, for the described preferred embodiment would be "0000". Bit $b_{11}$, called the BRANCH bit, indicates that the keyboard status is to be checked instead of performing some operation on the keyboard 50. Bit $b_{10}$, the BRANCH qualifier bit indicates what status or what voltage level will indicate the correct status for this particular instruction. Again, bits $b_4$, $b_5$ and $b_6$ as outlined in a table in FIG. *2a* selects which of the condition lines from the keyboard 50 will be applied to the status bus line 100. Bits $b_0$ through $b_3$ contain the NEXT RELATIVE ADDRESS (NRA). In this case, if the status indicates that no BRANCH is to be made, the next relative address is not applied to the address register 102 of the ROM 48 and the address is incremented by one only. If however, the status line 100 indicates that a BRANCH is to be made, bits $b_0$ through $b_3$ are added to the address register 102 to the ROM 48 as the next address from which the ROM instructions are to be derived.

Figure 3:
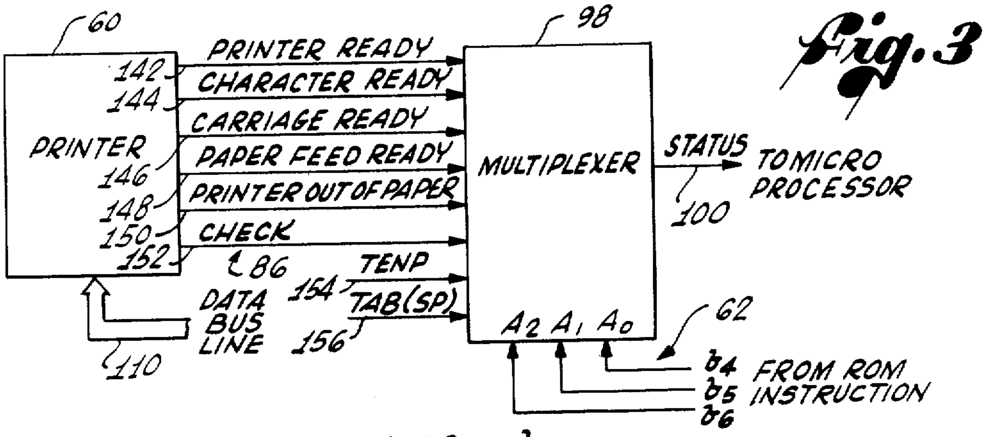
FIG. 3 is a block diagram of the technique for interrogating the printer as to its status.

FIGS. 3 and *3a* illustrates the general configuration of the status multiplexer employed to determine the condition of the printer 60 of the illustrated presently preferred embodiment. The actual operation of the printer 60 is fully described in copending applications, Ser. Nos. 229,314, 229,397 and 229,396 and will not be further described herein. Typically the printer condition bus 86 (FIG. 1) includes a number of condition lines pertinent to the operation of the printer 60. Particularly, there is a PRINTER READY line 142 which indicates that the printer 60 is ready to receive a character to be printed over the data bus 110, a CHARACTER READY line 144 which indicates that a character has been received and is ready to be printed, a CARRIAGE READY line 146 which indicates that the carriage has moved and is stopped and in position. Also, there is a PAPER FEED READY line 148 which indicates that the carriage has been indexed and is positioned for the next line of text, a PRINTER OUT OF PAPER line 150 which signals a need for more paper and a CHECK line 152 which signals that the printer 60 is inoperable at the moment. In addition, there is a 10 pitch (TEN P) line 154 which is permanently set to indicate, for example, whether pica or elite type is being used and a TAB (SP) line 156 to indicate whether a tab is set at a particular carriage position.

Figure 3A:
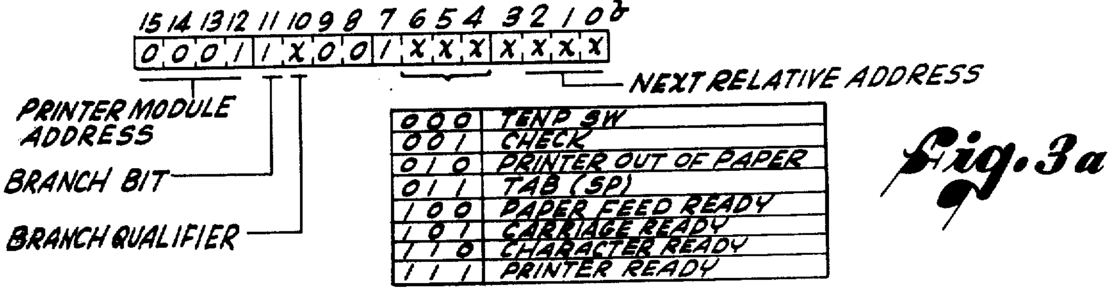
FIG. 3*a* is a tabular presentation of the format of the control characters for interrogating the printer.

Again, which of the condition lines 86 is connected to the status line 100 is dependent upon the bit arrangement of bits $b_4$, $b_5$ and $b_6$ of the control instruction on bus 62. This bit arrangement for the preferred embodiment is illustrated in FIG. 3*a*. Again bits $b_{12}$–$b_{15}$ is the module address for the printer 60 of the ROM instruction word, bit $b_{11}$ is the BRANCH bit and bit $b_{10}$ is the BRANCH QUALIFIER bit. As before, bits $b_0$–$b_3$ is the NEXT RELATIVE ADDRESS which is added to the ROM address register 102 will BRANCH if the BRANCH QUALIFIER bit $b_{10}$ is correct.

The status multiplexers for all the other peripheral units are constructed in the same manner as the keyboard status multiplexer 88 and the printer status multiplexer 98 with the sensed conditions being naturally dependent upon the type of peripheral.

ROM Instruction Format

Figure 4:
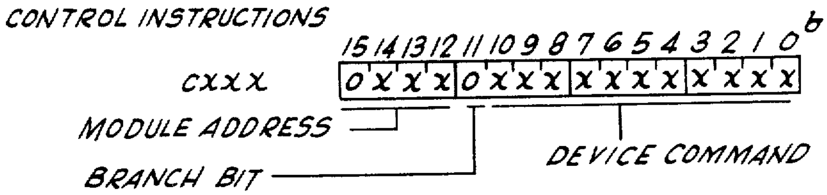
FIG. 4 is a tabular presentation of the general format of control instruction.
Figure 5:
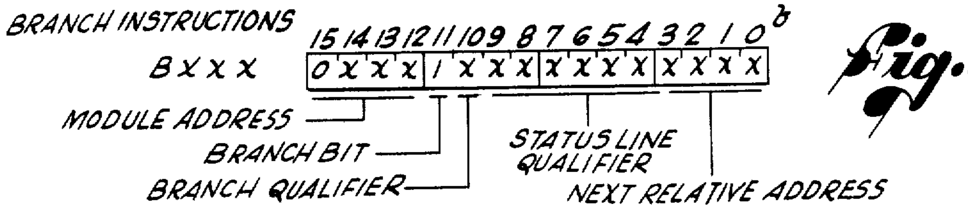
FIG. 5 is a tabular presentation of the general format of branch instruction.

All of the 4,096 ROM instructions can be broken down into three general classes with a few special instructions noted below. The instructions in the first class are control instructions which control the operations of the various peripheral units. The format of a general control instruction is illustrated in FIG. 4. Again, bits $b_{12}$–$b_{15}$ are the module address for a particular peripheral unit. A zero bit in the bit $b_{11}$, or BRANCH bit position specifies this instruction as a control instruction and bits $b_0$ through $b_{10}$ are bits available for a general device command instruction. The decoders 64–74 (FIG. 1) conventionally interpret bits $b_0$–$b_{10}$ to perform the commanded instruction either as a single step or a reference of steps which the peripheral independently performs.

The label CXXX is an alphabetic abbreviation of the particular control instruction. The missing letters would specify which peripheral was to be controlled. Thus in considering the abbreviations in the program listing of non-printed APPENDIX A, appearing in subject patented file, CPRT, for example, would mean "control the printer".

When the peripheral status multiplexer is to be addressed, the BRANCH bit $b_{11}$ is a one and the character of the instruction is changed. Thus in a second class of instruction, bit $b_{10}$ now becomes a BRANCH QUALIFIER, the value of which determines the status value upon which a BRANCH will occur. In this generalized instruction, bits $b_4$ through $b_9$ are STATUS LINE QUALIFIER bits which are decoded in the multiplexer in the manner described above for the keyboard and printer to connect a particular condition line to the status line. Bits $b_0$ through $b_3$ contain the NEXT RELATIVE ADDRESS which will be applied as the input to the ROM 48 if the BRANCH is taken.

Figure 2A:
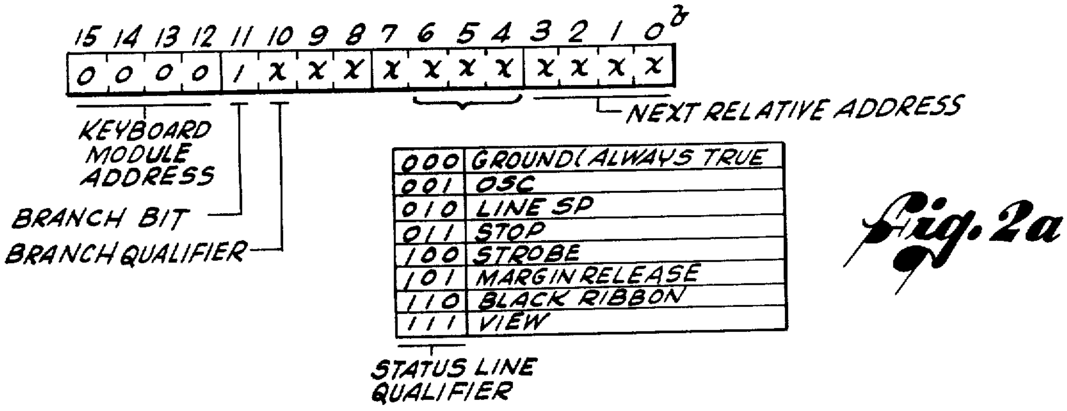
FIG. 2*a* is a diagrammatic tabular illustration of the format of the control characters for interrogating the keyboard.
Figure 6:
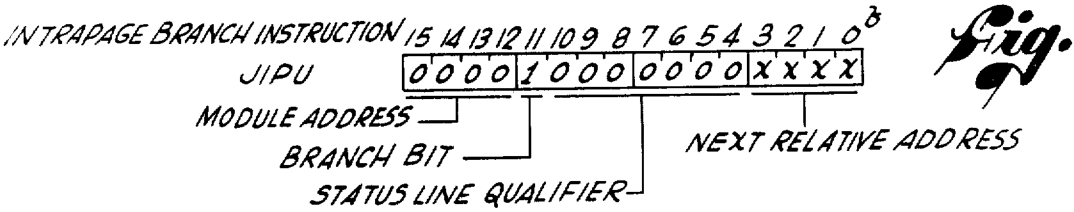
FIG. 6 is a tabular presentation of the format of the intrapage branch instruction.

The third class of instructions contains the special control instructions which control the internal operation of the microprocessor. The first of these special control instructions is the INTRA PAGE BRANCH instruction which specifies a jump to a new NEXT RELATIVE ADDRESS within the numerical limit of bits $b_0$–$b_3$ testing the status of a peripheral device as shown in FIG. 6. Note that bits $b_4$–$b_{10}$ are not needed and are fixed in the "0" state. Note also that the module address for the INTRA PAGE BRANCH instruction is the same as for the keyboard status instruction but that the interrogating bits $b_4$–$b_6$ are all "0" which is a ground in the keyboard STATUS LINE QUALIFIER so no interrogation occurs (see FIG. 2*a*). Thus the same module address serves two purposes, increasing the number of module addresses available.

Figure 7:
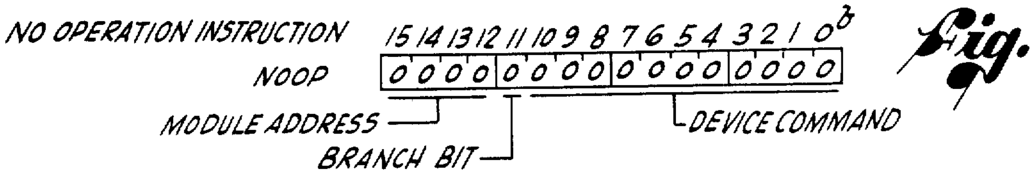
FIG. 7 is a tabular presentation of the format of the no operation instruction.

FIG. 7 shows the no operation (NOOP) instruction or the no-command-operation. The NOOP instruction has all bits "0" which initiates no operation. For this instruction, the machine is idle during that clock time and moves on to the next sequential address in the next clock time. This instruction provides time delay for time consuming processing. The return (RETN) instruction (illustrated in FIG. 8 has "0's) in every bit position except bits $b_0$ to $b_3$ which are all one's which signals the ROM address register 102 to return to the instruction stored in the return address stack register 106 incremented by one.

Figure 9:
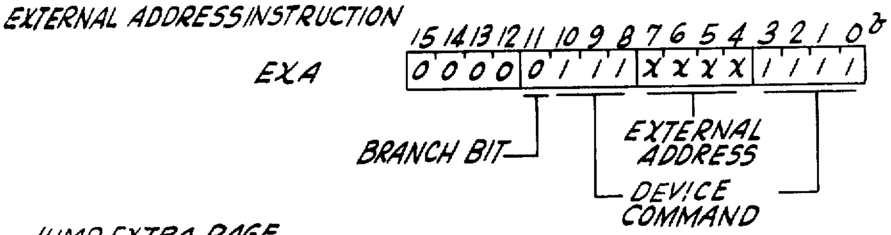
FIG. 9 is a tabular presentation of the format of the external address instruction.

FIG. 9 illustrates the external address instruction (EXA) in which the next address is taken from an outside source for certain auxiliary control operations. This is a little used special instruction.

Figure 10:
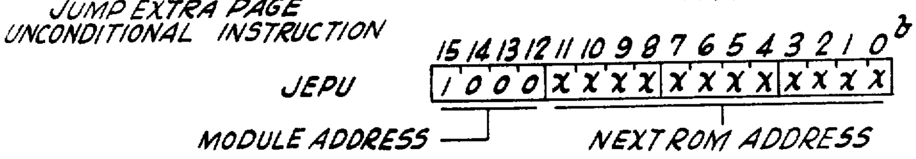
FIG. 10 is a tabular presentation of the format of the jump extra page unconditional instruction.

FIG. 10 illustrates the jump-extra-page unconditional instruction (JEPU). This instruction simply loads bits $b_0$–$b_{11}$ into the ROM address register 102 unconditionally, without the need for a status inquiry.

Another group of control instructions are those which operate on data. These instructions are used mainly for testing data for various types of characters and conditions in order to decide what further operations need to be performed on the data. These instructions may be branching instructions or control instructions. If branching instructions, the data is normally tested for certain conditions to take one or another different branches depending on the type of data. The control instructions generally perform some operation on the data unconditionally with no testing performed.

Figure 11:
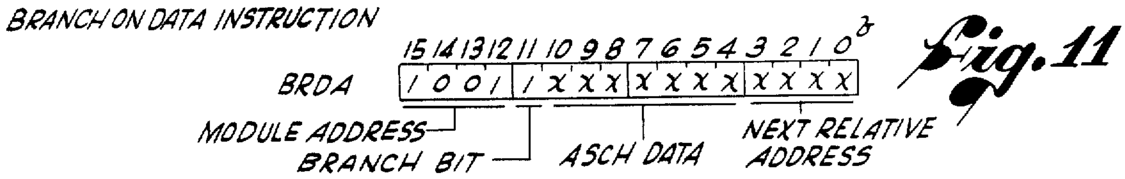
FIG. 11 is a tabular presentation of the format of the branch on data instruction.

FIG. 11 shows the simplest form of the data instruction. The BRANCH on data (BRDA) instruction simply BRANCHES to the NEXT RELATIVE address. Bits $b_4$–$b_{10}$ are in the form of ASCII data. The instruction is used to test for blank characters in a buffer memory.

Figure 12:
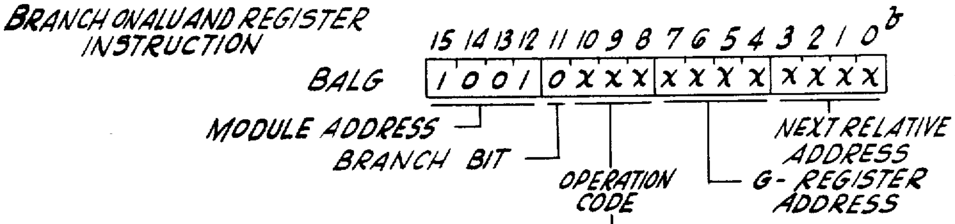
FIG. 12 is a tabular presentation of the format of the branch on ALU and G register instruction.

FIG. 12 illustrates the format of a BRANCH ON ALU and G REGISTER instruction (BALG) which utilizes the arthmatic logic unit (ALU) and data stored in one of the G registers and the master register (M). As noted above, the arithmetic logic unit is capable of performing eight different logic functions which are tabulated in FIG. 12. Bits $b_8$–$b_{11}$ specify which of the functions the ALU is to perform. As can be seen from the tabulation, various functions involving the character in the M register and the character in the G register may be performed. Typically, data temporarily stored in the M register is tested for various characteristics by utilizing the arithmetic and logic functions of the ALU. It should be noted that a next relative address at bits $b_0$–$b_3$ is included in the instruction and depending on the result after the arithmetic or logic function is performed, the next sequential ROM instruction will be executed or a BRANCH will be performed to the NEXT RELATIVE ADDRESS.

Figure 13:
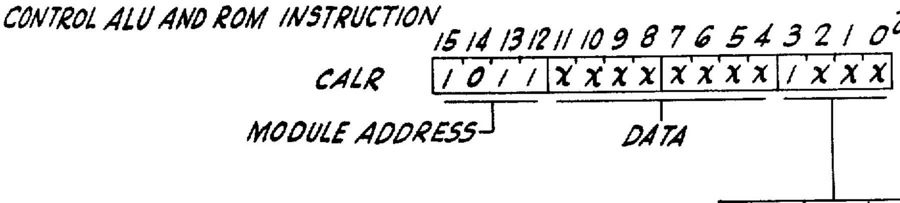
FIG. 13 is a tabular presentation of the format of the control ALU and ROM instruction.

FIG. 13 illustrates a CONTROL ALU AND ROM instruction (CALR) in which the number to be compared is permanently stored as a part of the ROM instruction at bits $b_4$–$b_{11}$. In this instruction, bits $b_0$–$b_3$ indicate the function to be performed by the arithmetic logic unit. Thus, the characteristics of standard characters such as function characters may be permanently stored within the ROM as data and compared with an incoming character to determine the particular type of function, if any.

Note that the operation code tabulated in the BRANCH ON ALU AND G REGISTER INSTRUCTION shown in FIG. 12 and the function specifier tabulation for bits $b_0$–$b_3$ of the CONTROL ALU AND ROM INSTRUCTION shown in FIG. 13 are different. This is because the arithmetic logic unit 114 is capable of performing either arithmetic operations as needed for the BRANCH instruction or logic functions as needed for the CONTROL instruction. The complete capability of the ALU 114 is tabulated in FIG. 16a with the effect of the various control signals such as the mode selector bit $b_1$ (FIG. 17) illustrated while the ALU 114 is commercially available, it will be appreciated that the tabulated arithmetic operations and logic functions as well as the control signals are related to the operation of the microprocessor of the present invention.

Figure 14:
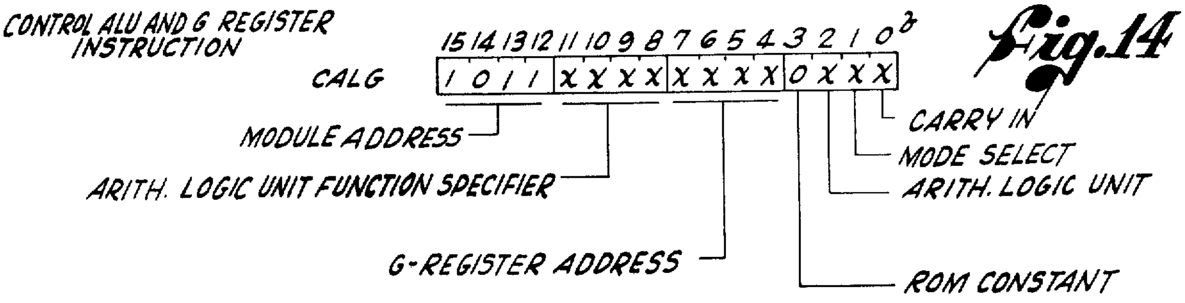
FIG. 14 is a tabular presentation of the control ALU and G register instruction.

FIG. 14 illustrates a CONTROL ALU and G REGISTER instruction (CALG) involving the arithmetic logic unit and one of the G registers. Again, bits $b_8$–$b_{11}$ specify the ALU function to be performed, bits $b_4$–$b_7$ select the G register to be used and bits $b_0$–$b_3$ are signal lines which condition other circuitry for following instructions if necessary.

Figure 15:
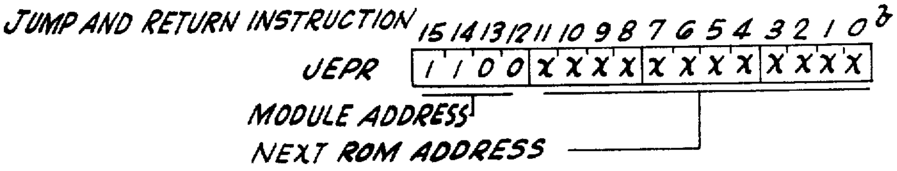
FIG. 15 is a tabular presentation of the format of the jump and return instruction.

FIG. 15 illustrates the JUMP AND RETURN instruction (JEPR). When this instruction is reached, the processor automatically shifts to a different section of the ROM program and executes an entire subroutine before returning to the next instruction. When this instruction is reached, the present ROM address is stored in the return and address stack register (FIG. 1) and the processor jumps to the next ROM address specified by bits $b_0$–$b_{11}$ of the instruction. When the specified subroutine is completed, a RETN instruction (FIG. 8) returns the ROM address to that stored in the Return Address Stack register 106 incremented by one.

FIG. 16 illustrates the format of the BRANCH ON ALU AND H REGISTER instruction (BALH). This instruction is exactly the same as the instruction illustrated in FIG. 12 except that the H registers are used instead of the G registers.

FIG. 17 illustrates the CONTROL ALU AND H REGISTER instruction (CALH). Again, the format is the same as that for FIG. 14 except that the H registers are used.

MICROPROCESSOR

ROM Addressing Section

Figure 17A:
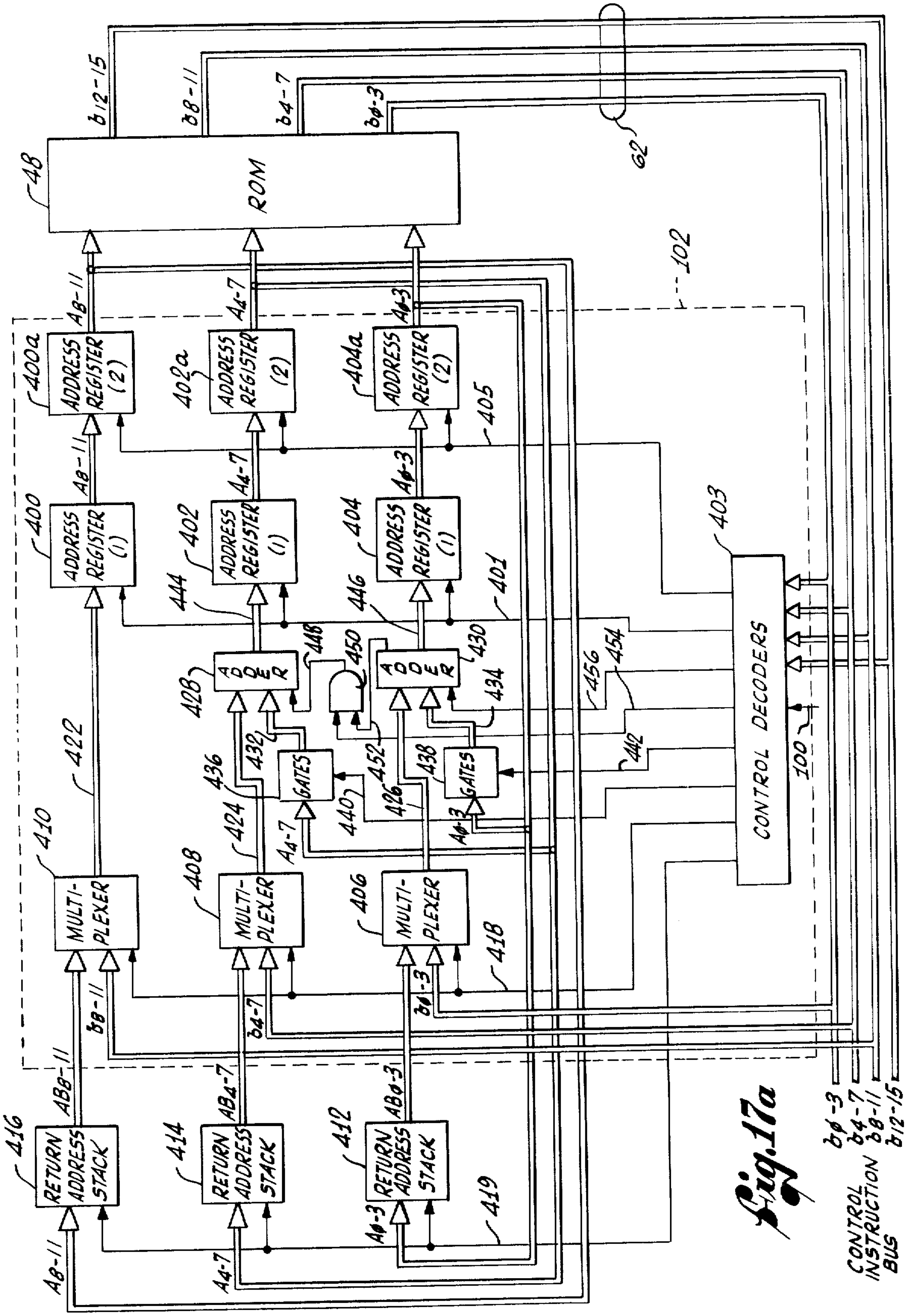
FIG. 17*a* is a block diagram of the read-only memory addressing section of the microprocessor of the invention.

FIG. 17a is an expanded block diagram of the ROM ADDRESSING SECTION utilized in the microprocessor of the present invention. Basically FIG. 17a is an expanded version of the ROM 48 address register 102 and return address stack register 106 shown in FIG. 1. The ROM ADDRESSING SYSTEM has been expanded to illustrate the technique of the present invention for deriving an address for the ROM 48 which results in the generation of the correct control instruction on the control instruction bus 62.

In particular, the generated control instruction is shown as four four-bit data words, $b_{0-3}$, $b_{4-7}$, $b_{8-11}$ and $b_{12-15}$. Additionally, the 12-bit ROM address has been shown as three four bit address data words, $A_{0-3}$, $A_{4-7}$ and $A_{8-11}$. This separation of the ROM address and control instruction into smaller data words more clearly illustrates the various combinations of data words which can make up a new ROM address in response to a present control instruction.

The ROM address register 102 shown in FIG. 1 has been expanded within the dotted line in FIG. 17a. The actual address registers are constructed in the split address register form in accordance with well known logical implementation techniques. Thus, three four bit address registers 400, 402 and 404 are connected via buses $A_{8-11}$, $A_{4-7}$ and $A_{0-3}$ to corresponding address registers 400a, 402a and 404a. Data entry into the first address registers is effected by a signal on the control line 401 connected to a control decoder 403, the operation of which will be described below. Similarly, data entry into the second address registers 400a, 402a and 404a is under the control of a signal on line 405 also connected to the control decoder 403. It should be appreciated that with the split register technique, an address can be entered into the first address registers 400, 402, and 404 and their electrical signals stabilized prior to entering that address into the second address registers 400a, 402a and 404a. This technique also permits setting up a new address in the first address registers 400, 402 and 404 while the ROM is still being addressed by the second address register 400a, 402a and 404ain order to maintain a constant control instruction on the control instruction bus 62 controlling the operation of the remaining logic circuits with that control instruction.

As was briefly described above with reference to FIG. 1, a new ROM address may be derived from numerous combinations of data bits. In particular, the new ROM address may be derived from the first twelve bits of the control instruction word $b_{0-11}$ or from the first eight bits of the present ROM address $A_{0-7}$. The new ROM address may also be derived from a prior ROM address which has been stored in the RETURN ADDRESS STACK register $AB_{0-11}$. In addition, when the next relative address technique is employed, certain of these data bit combinations must be added together to form a portion of the new ROM address. Provision for deriving the new ROM address from these various bit combinations is effected by utilizing conventional multiplexing and gating techniques. Thus, bits $b_{0-3}$, $b_{4-7}$ and $b_{8-11}$ are connected as first inputs to respective multiplexers 406, 408 and 410 and the outputs from the return address stack registers 412, 414 and 416 ($AB_{0-3}$, $AB_{4-7}$ and $AB_{8-11}$, respectively) are connected as second inputs to multiplexers 406, 408 and 410 respectively. Which of the first or second inputs to multiplexers 406, 408 and 410 is selected discovered by the signal on a control line 418 connected to the control decoder 403 and transfer of data into and out of the return address stack registers 412, 414 and 416 is determined by the signal on a control line 419 also connected to the control decoder 403. While the output of multiplexer 410 is fed directly, via a bus 422, to address register 400 the outputs from multiplexers 408 and 406 on buses 424 and 426 respectively serve as first inputs into a part of adders 428 and 430 respectively. The second inputs to adders 428 and 430 on buses 432 and 434 respectively are taken from ROM address bits $A_{4-7}$ and $A_{0-3}$ through respective conventional logic gates 436 and 438. Again, whether the ROM address bits $A_{0-7}$ are selected for addition with the output of multiplexers 408 and 406 is governed by control signals on lines 440 and 442 respectively connected to the control decoder 403.

The output of adders 428 and 430 are connected via the buses 444 and 446 respectively to the address registers 402 and 404 respectively. Data flow through adder 428 is controlled by signals on a line 448 connected to the output of an AND gate 450 whose inputs are a carry signal on line 452 from adder 430 and a control line 454 from the control decoder 403. Data flow through adder 430 is controlled by line 456 also connected to the control decoder 403. The operation of the gates and multiplexers in the selection of a new ROM address be transferred to the first address registers 400, 402 and 404 will be discussed in detail below with respect to particular ROM addressing sequences corresponding to particular classes of control instructions on the bus 62.

The control decoder 403 is a conventional design and comprises a plurality of logic gates designed to provide suitable control signals to the remaining logic circuits in accordance with particular control instruction words applied to the control decoder. The conventional design of the control decoder logic circuitry forms no part of the present invention but the particular logic gate configuration for a presently preferred embodiment of the present invention may be found in the schematic diagram shown in non-printed Appendix E, appearing in subject patented file.

Figure 17B:
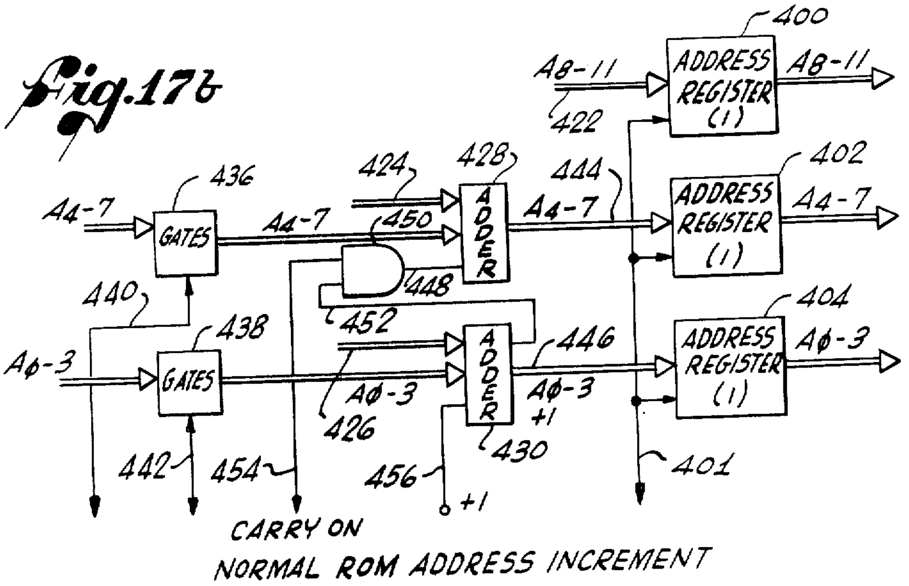
FIG. 17*b* is a partial block diagram of the read-only addressing section illustrating the operation of a NORMAL ROM ADDRESS INCREMENT.

Turning now to the effect of particular classes of control instruction words, the simplest ROM address change is a simple increment of the least significant digits such as following a simple control instruction for a branch instruction does not result in a branch. This simple ROM address change is illustrated in FIG. 17*b*. In this address change address bits $A_{8-11}$ are not changed so address register 400 is not effected and when the transfer signal on line 401 appears, the present address in address register 400 will be transferred to the second address register.

For simple incrementation, address bits $A_{0-7}$ may be effected so the carry signal on line 452 is connected to the incrementing input on line 448 of adder 428 and adder gate 450 is enabled by a CARRY ON signal on line 454. Since only the lower order bits of the ROM address are utilized, the bits from the multiplexers on 424 and 426 are not effective and gates 436 and 438 are enabled via their control lines 440 and 442 to pass present ROM address bits $A_{0-3}$ and $A_{4-7}$ to adders 428 and 430 respectively. A carry input signal is then applied on line 456 of adder 430 to increment the present address bits $A_{0-7}$ and $A_{4-7}$ applied to the adder 430 through gates 438 and 436, respectively, and enabled by lines 442 and 440 respectively. There will be a carry of incremental one to adder 428 through AND gate 450 whenever the incremented data word $A_{0-7}$ is transferred to address registers 402 and 404 which applies an address $A_{0-7}$ to the ROM.

Figure 17C:
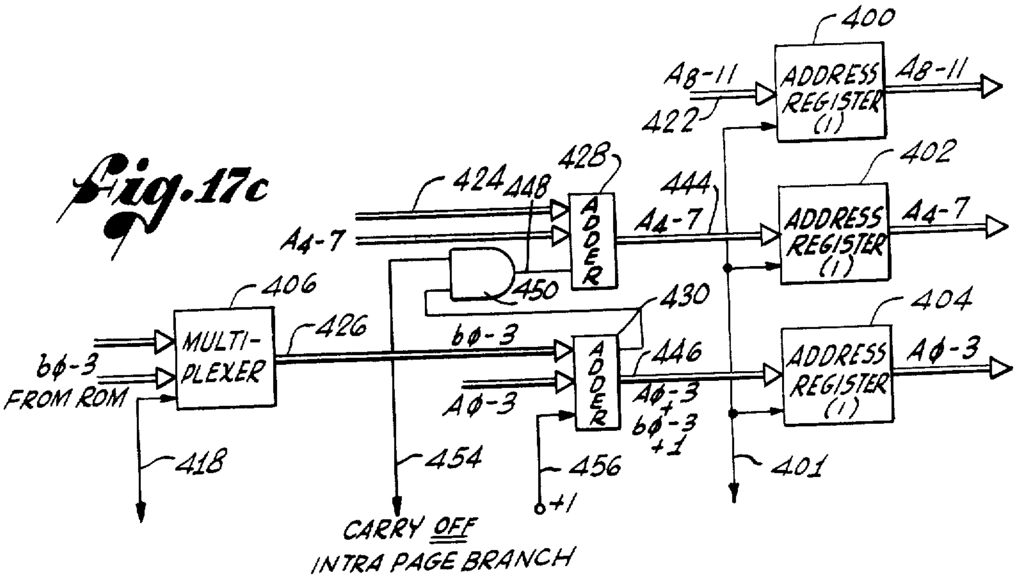
FIG. 17*c* is a partial block diagram of the read-only addressing section illustrating the operation of the INTRA PAGE BRANCH instruction shown in FIG. 6.
Figure 17D:
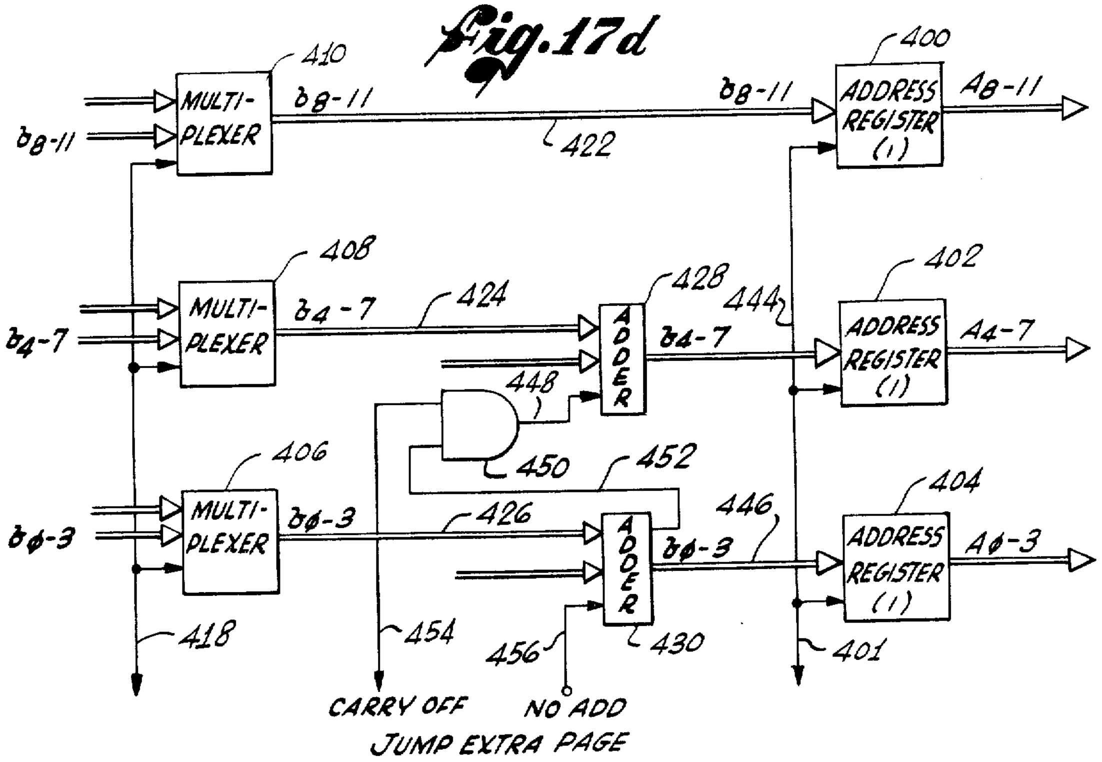
FIG. 17*d* is a partial block diagram of the read-only addressing section illustrating the operation of the JUMP EXTRA PAGE instruction shown in FIG. 10.

The next class of new ROM address is that developed when, for example, a branch instruction results in an INTRA PAGE BRANCH using the NEXT RELATIVE ADDRESS technique described above. In this case, the NEXT RELATIVE ADDRESS is taken from the least significant bits $b_{0-3}$ from the control instruction word. Those bits are added to the present $A_{0-3}$ bits of the present ROM address. The bit flow for this instruction is illustrated in FIG. 17*c*. Bits $b_{0-3}$ are available as a first input to multiplexer 406 and with a suitable control signal on line 418 will be transferred via bus 426 to the second input to adder 430. It should be appreciated that the NEXT RELATIVE ADDRESS technique effects only the first four bits of the ROM address $A_{0-3}$. Therefore, there must be no carry from adder 430 over to adder 428. Thus, the carry enabling signal on line 454 is turned off prohibiting any carry on line 452 to be transferred to adder 428. ROM address bits $A_{0-3}$ are available as the first input to adder 430 and upon a suitable control signal on line 456 bits $A_{0-3}$ and bits $b_{0-3}$ are binarily added and incremented by one the result appearing on bus 446 applied to the address register 404. Thus it can be seen that only address register 404 is effected.

The third class of new ROM address is that generated when the control instruction is an JUMP EXTRA PAGE instruction such as that illustrated in FIG. 10. For this instruction, it should be noted that all twelve ROM address bits are changed in accordance with bits $b_{0-11}$ of the present control instructions. These control instruction bits are available as a first input to multiplexes 406, 408 and 410 as described above. Thus, a suitable control signal is placed on line 418 permitting the gating of bits $b_{0-3}$ through multiplexer 406 onto bus 426 into adder 430, gating bits $b_{4-7}$ through multiplexer 408 onto bus 424 to adder 428 and gating bits $b_{8-11}$ through multiplexer 410 to bus 422 directly into address register 400. As the data bit pattern of bits $b_{0-11}$ are to be transferred directly to the address register, the carry and enable signal on line 454 is turned off and the +1 addition signal on line 456 is also disabled so that the addition of the signal bit performed for the other instructions is deleted. Again, in the above, a suitable signal on line 401 gates the data bits on buses 446, 444 and 422 directly into address registers 404, 402 and 400, respectively.

Figure 8:
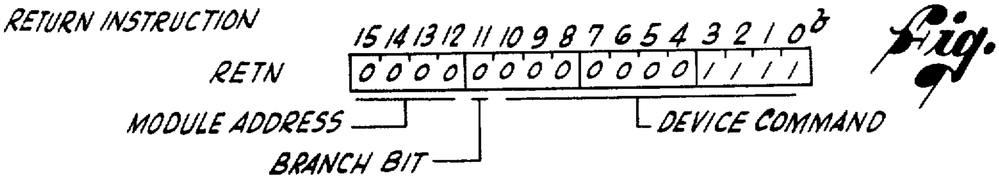
FIG. 8 is a tabular presentation of the format of the return instruction.

A final class of ROM instruction sequence is the general RETURN address instruction illustrated in FIG. 8. In this instruction, a ROM address previously stored in the return address stack register 106 (FIG. 1) is returned to the ROM address register 102, presumably following the completion of a set of subroutine instructions caused by a JUMP EXTRA PAGE instruction.

Figure 17E:
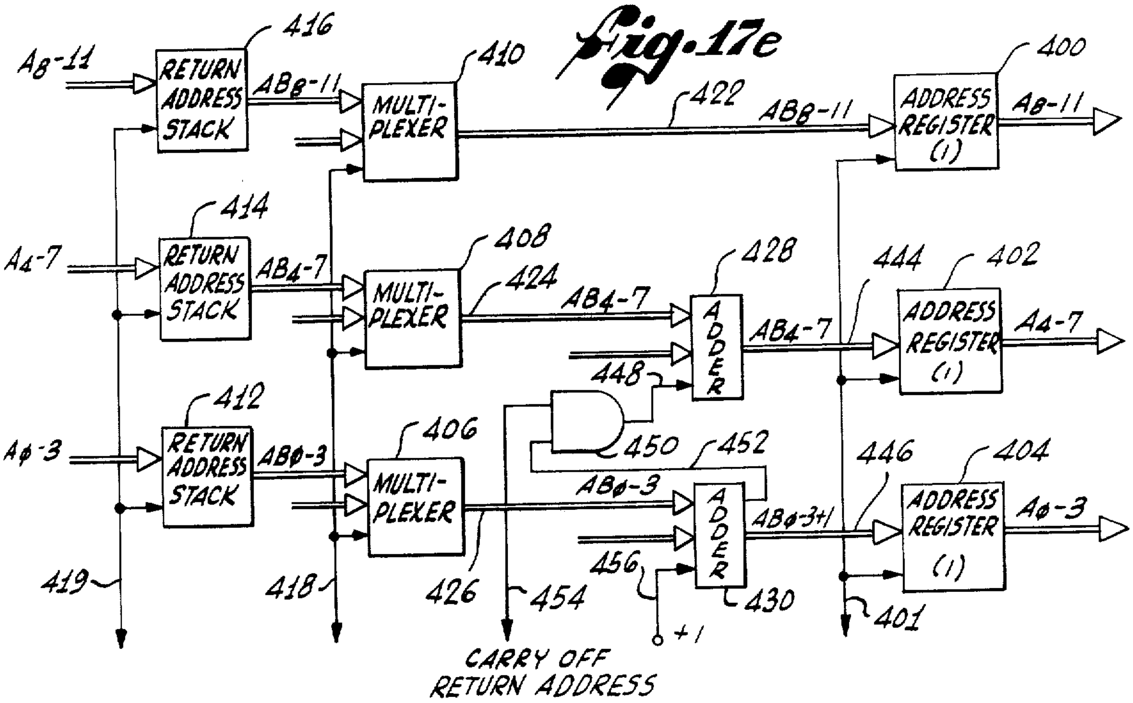
FIG. 17*e* is a partial block diagram of the read-only addressing section illustrating the operation of the RETURN instruction shown in FIG. 8.

The ROM address sequence for this class of instruction is illustrated in FIG. 17*e* in which it is presumed that a ROM address $A_{0-11}$ has been previously stored in the return address stack registers 412, 414 and 416. The output of the return address stack registers 412, 414 and 416 are available as first inputs to the multiplexers 406, 408 and 410 and, with suitable control signals on lines 419 and 418, the stored address generally as a $AB_{0-11}$ is transferred out of the return address stack registers 412, 414 and 416 through multiplexers 406, 408 and 410 onto the buses 426, 424 and 422, respectively. Bits $AB_{0-11}$ are transferred directly on bus 422 to the address register 400 while bits $AB_{0-7}$ are transferred into adders 430 and 428, respectively. Again, the data bits are to be transferred directly to the address registers so the CARRY enable signal on line 454 is disabled. As bits $AB_{0-3}$ pass through adder 430, the +1 condition on line 456 causes the addition of one bit to the data word in adder 430 resulting in a single increment of the ROM address $AB_{0-11}$ as it is transferred into the address registers 404, 402 and 400.

Thus, the interconnection of the various registers, multiplexers and adders to modify the ROM address to produce a particular desired ROM control instruction on bus 62 are illustrated in FIGS. 17*b* through 17*e* again with the control decoder 403 shown in FIG. 17*a* providing the proper control signals on the control lines to activate the correct logic elements to perform the instruction on the control instruction bus 62.

DATA PROCESSING SECTION

Figure 17F:
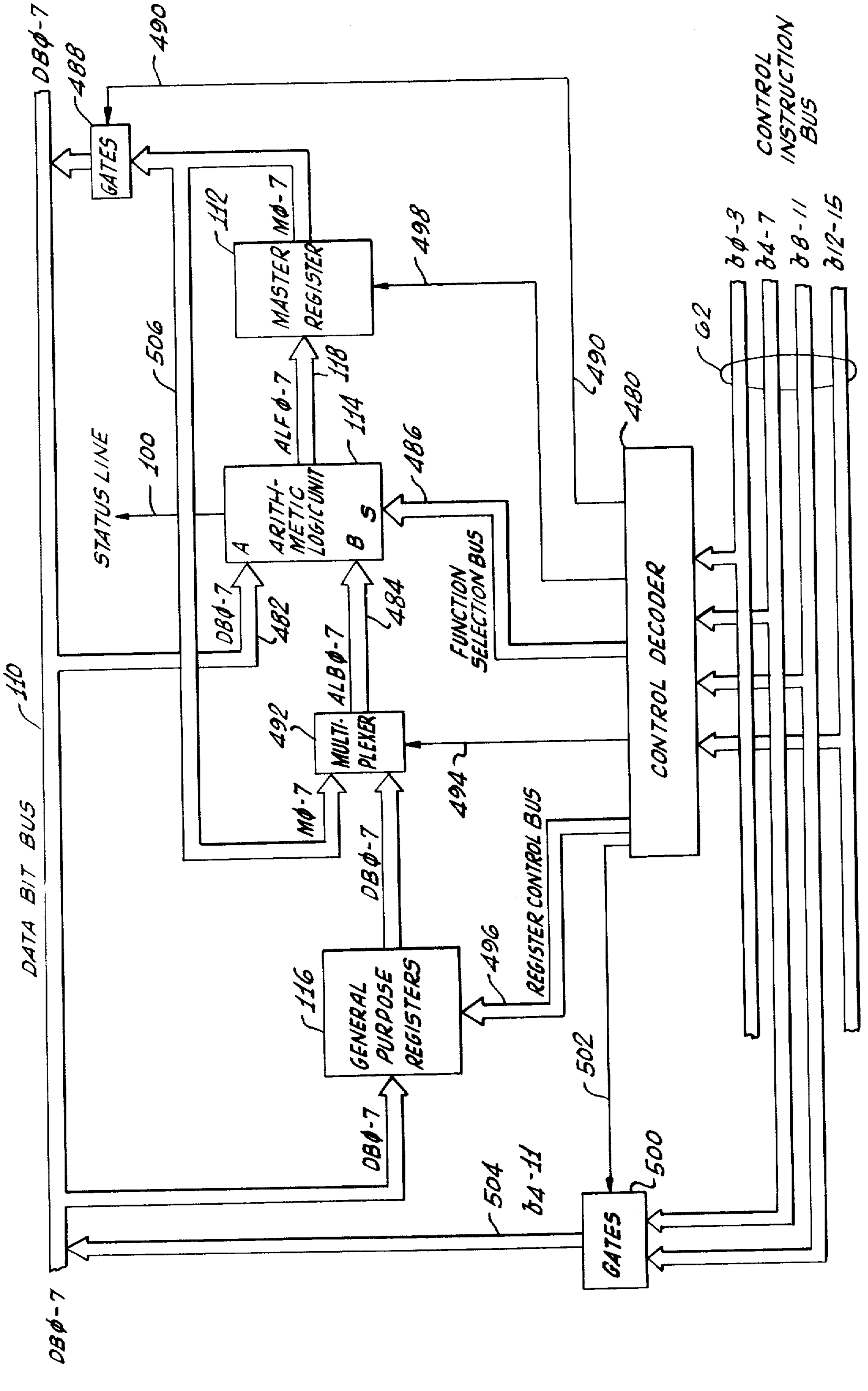
FIG. 17*f* is a block diagram of the data processing section of the microprocessor of the invention.

The data processing section of the microprocessor forming the present invention is illustrated and expanded in block diagram FIG. 17*f*. Basically, all data flow through the data processing section of the microprocessor is under the control of a control decoder 480 constructed similarly to the control decoder 403 in the ROM address register. Thus, the control decoder 480 comprises a plurality of conventional logic gates having as their input, bits $b_{0-15}$ of the control instruction bus 62. Control signals on various control lines generated in response to the particular control instruction operate the various general purpose registers multiplexers and the arithmetic logic unit of the data processing section of the microprocessor. Again, the design in interconnection of the logic elements in the control decoder 480 is conventional and forms no part of the present invention. However, the particular logic elements for a presently preferred embodiment of the microprocessor is shown in the schematic diagram of Appendix E.

Data flow through the data processing section is principally via the data bus 110 which carries bits $DB_{0-7}$.

Basically, each step in any operation on the data bus 110 requires a separate control instruction on bus 62. Therefore, a master register 112 is provided for general storage of data words as they are being processed. All data entries into the master register 112 are made through the arithmetic logic unit 114 onto a bus 118 having a generalized bits $ALF_{0-7}$. As briefly stated above, the arithmetic logic unit 114 incorporated into the data processing section of the microprocessor of the present invention is constructed of commercially available monolithic chips designed to perform a plurality of arithmetic and logic operations on a pair of inputs at an A input 482 and a B input 484. Which arithmetic or logic function is to be performed is controlled by a 4-bit data word appearing at an S input 486. The details of the operation of such arithmetic logic units are well known in the art and form no part of the present invention. The operations of the ALU 114 which may be performed are tabulated in FIG. 16*a* as described above.

In the data processing system of the present invention, the arithmetic and logic functions of ALU 114 are utilized to test and compare data bits contained in the master register 112 ($M_{0-7}$) the data bit bus ($DB_{0-7}$) a data word $DB_{0-7}$ previously stored in the general purpose registers or bits $b_{4-11}$ of the control instruction bus. Which of the data bit words are selected to be applied to the A input 482 or B input 484 of the ALU 114 is determined by control lines eminating from the control decoder 480.

The control instructions which activate the data processing section of the present invention are those which call for some operation through the ALU 114. For example the outlined instruction words shown in FIGS. 12, 13, 14, 16 and 17 require the use of the ALU 114. Particularly, function selection code shown in the outlining instructions of those figures would be applied to the S input 486 from the function selection bus. The tabulated operation would then be performed. For example, for the BRANCH ON ALU AND G REGISTER instruction shown in FIG. 12, the contents of the M register $M_{0-7}$ would be gated onto the data bit bus 110 through a set of gates 488 by means of a signal on control line 490 and be simultaneously gated into the A input 482 of the ALU 114. Depending upon the function selected, the data transferred into the A input 482 of the ALU would either be tested for some condition such as 0 or the contents of a G general purpose register 116 would be gated through a multiplexer 492 by means of a signal on a control line 494 into the B input 484 of the ALU 114. Some function such as a test or comparison would then be made upon which a decision to branch could be made. Whether the branch is taken would be indicated by a suitable signal on the status line 100.

Which of the 16 G registers selected is controlled by a suitable register address on a register control bus 496 coming from the control decoder 480. Since the branch instruction determines whether the branch is taken, the results need not be restored in the master register 112 and a suitable inhibiting signal is applied on control line 498 to prevent the results appearing on bus 118 from re-entering the master register.

Considering now a CONTROL ALU AND G REGISTER instruction such as that illustrated in FIG. 14, the contents of the master register 112 are again gated through the gates 488 to the data bit bus 110 and are available at the A input 482 of the arithmetic logic unit 114. A previously stored data word in the G general purpose registers 116 is gated through multiplexer 492 to the B input 484 of the ALU 114. Again, which of the 16 G address registers 116 is selected is determined by address register word on the register control bus 496 from the control decoder 480. For a control instruction, some operations such as addition and subtraction, or the like is performed by selection of the proper word at the S input 486 of the ALU 114. Following the function, the newly created data word is gated via bus 118 into the master register 112 by means of a suitable control signal on line 498. An example of the functions which can be generated is shown in the tabulated function specifier illustrated in FIG. 16*a*, which indicates that data can be merely taken from the general purpose register with no arithmetic or logic function being performed and transferred into the master register 112 or in the opposite manner merely transfer data from the master register through the gates 488 onto the data bit bus line 110 and thence into the appropriate general purpose register 116.

A third type of instruction which employs the data processing section is the CONTROL ALU AND ROM instruction illustrated in FIG. 13. In this instruction, a data word which comprises bits $b_{4-11}$ of the control instruction is to be processed through the ALU 114, potentially with the present contents of the master register 112 to develop a new data word to be inserted in the master register. To effect this control instruction, bits $b_{4-11}$ are sent through gates 500 by means of a signal on control line 502 to the data bit bus 110 and thence into the A input 482 of the ALU 114. As the A input 482 ordinarily has the contents of the master register 112 as its input, the contents of the master register $M_{0-7}$ bypass gates 488 by means of an inhibiting signal on line 490 and serve as a first input to the multiplexer 492. The master register data word $M_{0-7}$ are then gated through the multiplexer 492 by means of a suitable signal on the control line 494 into the B input 484 of the arithmetic logic unit. Thus, the present contents of the master register 112 and the data bits $b_{4-11}$ from the control instruction are available as inputs to the arithmetic logic unit and a function selected by a function selection word on the S input 486 of the ALU 114. Following the performance of the function, the result is then gated into the master register 112 to complete the execution of the instruction.

Thus, it can be seen that numerous operations on various data words can be performed within the data processing section of the microprocessor of the present invention. It should be appreciated that these functions include simply transferring data from one section of the complete word processing system to another or performing complex arithmetic and logic functions on single or combined data words previously stored within the system.

SYSTEM FLOW CHARTS

Idle Sequence

The basic operation of the microprocessor of the system is best illustrated by means of the flow charts shown in FIGS. 18–28. Generally, operations are performed by subroutines which BRANCH from a basic control subroutine which is in continuous operation and to which all other subroutines must periodically return.

Figure 18:
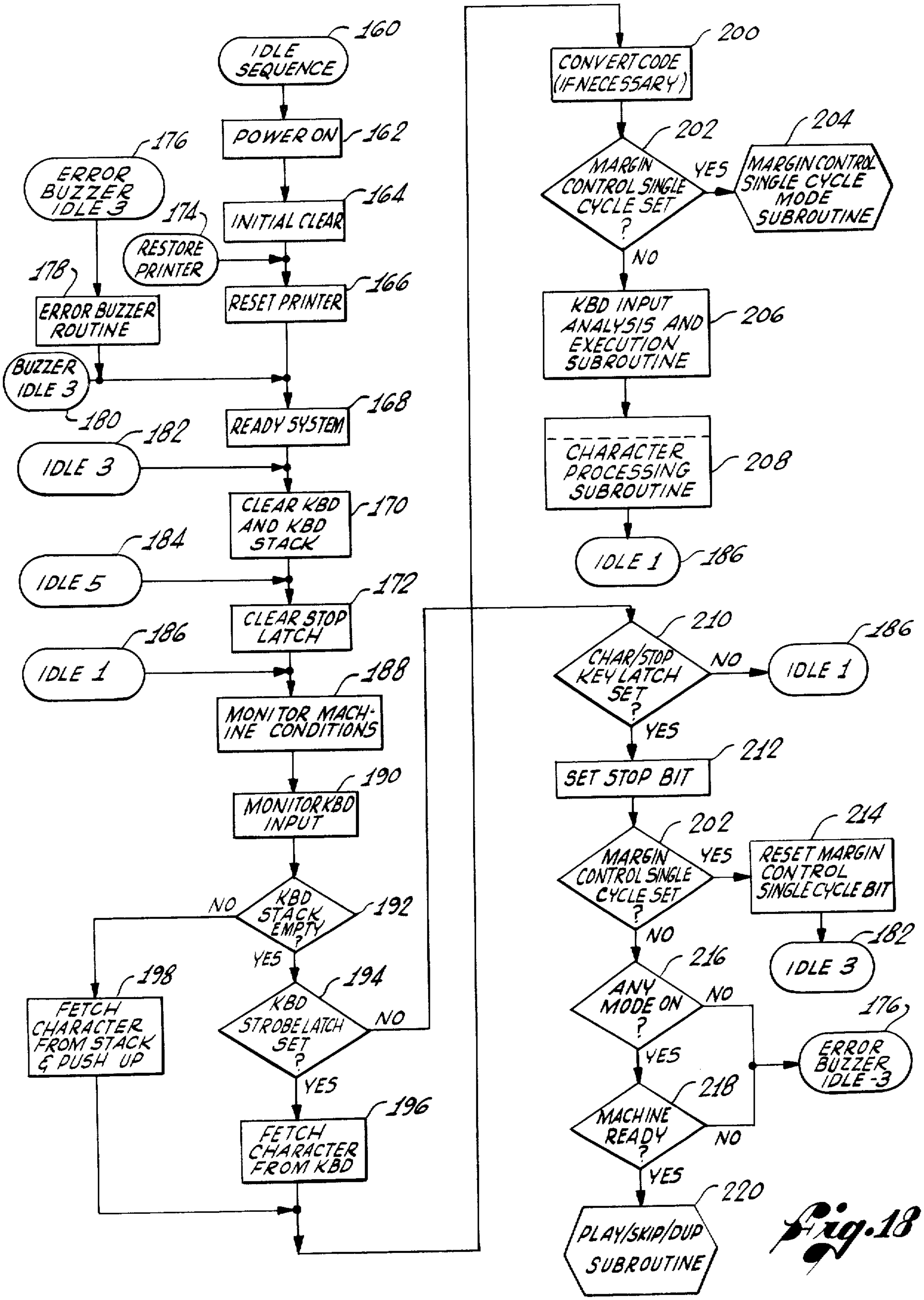
FIG. 18 is a system flow chart for the general control or idle sequence routine.

This basic control subroutine is called the IDLE SEQUENCE for the presently preferred embodiment of the invention and is illustrated in FIG. 18. As can be seen, the IDLE SEQUENCE 160 begins following an initializing sequence including the functions of turning the POWER ON 162 which is a manual control function, INITIAL CLEAR 164 which includes the initial clearing of registers and the like, a RESET PRINTER 166 function which conditions the printer 60 or other output device for operation in any well known manner, and a READY SYSTEM 168 function which readies the internal hardware components of the system for operaation. A CLEAR KEYBOARD AND KEYBOARD STACK 170 function readies the keyboard for input and a CLEAR STOP LATCH 172 function opens the keyboard to use.

The initializing sequence is then completed and the basic idle loop sequence can begin. In the overall operation of the system, the initializing sequence is occasionally utilized on correct particular erroneous conditions. For example, whenever a new printing sequence is to be started, such as a new typewritten page, a RESTORE PRINTER 174 input to the RESET PRINTER 166 function prepares the printer for this operation. The RESTORE PRINTER 174 input also insures that the system is completely ready to process a new block of data, from a buffer for example.

If an error in the operation occurs, an ERROR BUZZER IDLE 3 176 input is used to perform an ERROR BUZZER ROUTINE 178 to alert the operator to the error. The initializing sequence is then performed starting with the READY SYSTEM 168 function. In other cases, there may be no error but the operator must be alerted to a certain condition, such as when an operator decision must be made concerning a hyphen at the end of a line. In this case, an BUZZER IDLE 3 180 input is used to the READY SYSTEM 168 function. In normal operation, only particular sections of the initializing sequence need be used and IDLE 3 182 and IDLE 5 184 inputs are used to enter the CLEAR KEYBOARD AND KEYBOARD STACK 170 function and the CLEAR STOP LATCH 172 function, respectively. An IDLE 1 186 input is the normal input to the general idle loop which begins with a MONITOR MACHINE CONDITIONS 188 function which generally examines the state of machine hardware devices such as control switches, limit switches, tape speed indicators, and the like which are well known and form no part of the novel features of the system of the present invention. If, during the MONITOR MACHINE CONDITIONS 188 operation, it is determined that particular machine operations have to be performed, the operations are executed according to a present priority depending upon the length of time signals are available or the particular execution time needed for the operation.

As the main input to the system is a keyboard 50 and the input characters from the keyboard occur in substantially random fashion, a separate MONITOR KEYBOARD INPUT 190 function is provided. Because of the random nature of the keyboard 50 entries, there are occasions when entries may be made at a rate above that required for general keyboard character processing. In such a case, keyboard entries are stored in a pushup keyboard stack register for processing as time becomes available. The keyboard stack register is made up of a group of H registers in the generaly purpose registers 116 (FIG. 1). If the pushup keyboard stack is in use, the characters in the stack must be processed before any incoming characters from the keyboard. Therefore, a KEYBOARD (KBD) STACK EMPTY 192 decision block determines whether the keyboard stack is empty. If the keyboard stack is empty, a KEYBOARD STROBE LATCH 194 decision block determines whether a keyboard character is ready to be entered into the processor. If the strobe latch is set, a FETCH CHARACTER FROM KEYBOARD 196 operation is executed.

If the keyboard stack contains characters waiting to be processed, the KEYBOARD STACK EMPTY 192 decision is no and a FETCH CHARACTER FROM STACK AND PUSH-UP 198 operation is executed and the first entered characer in the stack is entered in the master register 112 in place of the character from the keyboard 60. It should be noted that if the character is taken from the stack instead of the keyboard 60, the keyboard character is entered into the stack to await processing.

With a character from the keyboard 60 or stack in the master register 112, a CONVERT CODE 200 operation may be performed if a conversion is necessary between the keyboard code and the printer code.

It should be appreciated that sections of IDLE SEQUENCE 160 are used for most purposes, in particular, the MONITOR MACHINE CONDITIONS 188 operation is performed many times during the execution of a single operation requiring a considerable time period such as the execution of a carriage return. As such, the IDLE SEQUENCE 160 contains decision blocks which are indicative of the mode of operation of the machine. Therefore, it is next determined whether the machine is in the margin control mode by means of a MARGIN CONTROL SINGLE CYCLE SET 202 decision block. If the margin control mode is on, a MARGIN CONTROL SINGLE CYCLE MODE SUBROUTINE 204 is executed rather than continuing with a keyboard analysis. The MARGIN CONTROL subroutine (FIG. 19) is described in detail below.

If the processor is not in margin control mode, the character in the master register 112 from the keyboard 60 or keyboard stack is analyzed by a KEYBOARD INPUT ANALYSIS AND EXECUTION SUBROUTINE 206 in this subroutine, the character in the master register 112 is analyzed by well known conventional methods to determine whether or not it is a printing character, an operations character or a control character which is neither printed or recorded. After the nature of the character is determined a CHARACTER PROCESSING SUBROUTINE 208 is executed to either print the character or execute the function or condition the processor in accordance with a control character. The processor then returns to the IDLE SEQUENCE 160 via the IDLE 1 186 input to process another character.

If the keyboard stack is empty and the keyboard strobe latch is not set as determined by the KBD STROBE LATCH SET 194 the decision block, and there is no input from the keyboard at that particular time, the idle loop proceeds to an internal processing sequence. It should be appreciated that the keyboard 60 serves not only for the entry of characters into the processing system but also for the control of the RECORD, PLAY, REVISE, DUPLICATE and other modes of operation of the system. Therefore, it is of vital importance that the keyboard 60 input be monitored periodically even if the processing system is in an automatic mode.

If there is no keyboard input either on the keyboard 60 itself or in the keyboard stack, the KEYBOARD STROBE LATCH SET 194 decision block results in a NO answer and the automatic internal processing sequence is executed. Whether to continue operation in a particular mode is determined by a CHARACTER/STOP KEY LATCH SET 210 decision block and if the answer is NO, the routine returns to the IDLE SEQUENCE 160 through the IDLE 1 186 input. If the CHARACTER/STOP KEY LATCH is set, a SET STOP BIT 212 operation is performed and whether margin control is in effect is again tested by the MARGIN CONTROL SINGLE CYCLE SET 202 decision block. If margin control is set, a RESET MARGIN CONTROL SINGLE CYCLE BIT 214 operation is performed and the routine returns to the IDLE SEQUENCE 160 through the IDLE 3 182 input.

If margin control is not in operation, it is determined in an ANY MODE ON 216 decision block whether any of the other automatic operations are to be performed. The decision block tests to see whether the PLAY, SKIP or DUPLICATE subroutines are in effect and if so, a MACHINE READY 218 decision block determines whether a PLAY/SKIP/DUP 220 subroutine (FIG. 25) can be performed at that time. If no mode is on or the machine is not ready, the subroutine returns to the idle sequence through the ERROR BUZZER IDLE 3 176 input to alert the machine operator to that fact.

Thus, it can be seen that the IDLE SEQUENCE 160 is the main overall controlling subroutine and the keyboard 60 is periodically monitored to receive not only input characters but to receive control character instructions from the operator. When there is a keyboard 60 input, it is analyzed for content and processed either as an alphanumeric character or as a function character or as a control character. If there is no keyboard 60 input, the sequence continues in the IDLE LOOP.

An important feature the word processing system of the present invention is the margin control technique for editing recorded text which has been revised so that original functions such as carriage returns are no longer valid. The operation of the margin control subroutines are illustrated in FIGS. 19–24. Generally, when operating in the MARGIN CONTROL mode, it first is determined which of three different zones the character in question is in. The character is either at the left margin, within a text zone between the left margin and a margin zone, with the margin zone being defined as a predetermined number of characters away from the right margin. The character is processed is a manner dependent upon which zone it falls into. When MARGIN CONTROL is in effect, textual material is automatically rearranged from line to line regardless of the position of original tabs, spaces, carriage returns or the like. For example, if a carriage return in the original text happened to appear in the middle of a line in the revised textual material, the carriage return would be automatically converted to a space. Similarly, should the original text material extend beyond the end of a line in the revised text, the margin control subroutines would, if possible, determine a proper ending for the line and continue the original text on a new line following a generated carriage return. Thus, if particular characters such as a carriage return, space or a hyphen appear within the margin zone, the margin control routine would automatically convert the character to a carriage return and continue the text on the following line.

There are instances, however, when the margin control subroutines cannot determine a proper line ending. For example, if all of the characters within the margin zone are printable alphaumeric characters, such as in the case of a long word, the conventional line ending would be a hyphen between syllables of that word. However, the word processing system knows only that alphanumeric characters are present and nothing else. Therefore, the proper hyphenation of the textual material in the margin zone must be performed by the operator. In such a case, a MARGIN ZONE subroutine (FIG. 24) examines all of the characters within the margin zone and, if it is determined that a proper line ending cannot be found, the entire system goes into a SINGLE CYCLE routine in which the characters are printed out one at a time under operator control until the operator determines the position of the hyphen. When the operator then prints a hyphen, a carriage return is automatically generated and the text continues printing on the following line.

Figure 19:
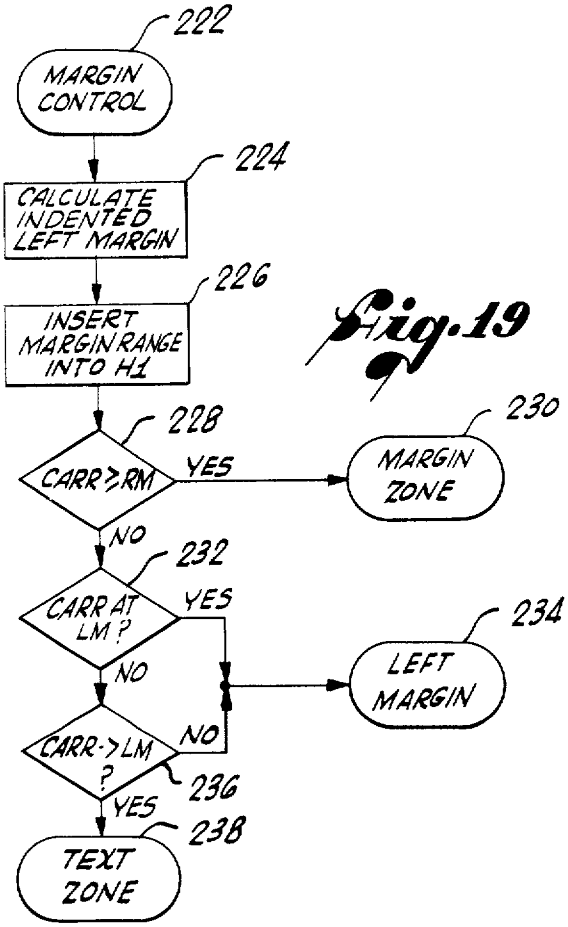
FIG. 19 is a system flow chart of the margin control subroutine.

The margin and text control subroutines are basically entered by means of the system flow chart shown in FIG. 19. Following a MARGIN CONTROL 222 input, a CALCULATE INDENTED LEFT MARGIN 224 operation is performed followed by an INSERT MARGIN RANGE INTO H1 226 operation. The printer utilized with the processing system of the invention has a character position for substantially every possible position on the paper utilized with the machine. Therefore, both the left and right margins are indicated as number positions on the paper and are stored in the general purpose register 116. Therefore, the left margin position set by the operator is calculated to be a position number along the line. Also, the margin range number of characters within the margin zone can be set by the operator and this information is inserted into one of the general purpose registers, H1 in the example shown in FIG. 19.

The carriage position (indicated by the signal CARR) is then tested against the stored left margin and margin range to determine which zone the character at that carriage position falls into. Therefore, a CARR ≧ RM 228 test is made to determine whether the carriage position is within the right margin range. If so, the basic subroutine BRANCHES to a MARGIN ZONE 230 input to that subroutine. If the carriage position is not in the margin zone, the additional test is made at CARR AT LM 232 decision block to determine if the carriage position is at the left margin. If so, the margin control subroutine BRANCHES to a LEFT MARGIN 234 subroutine input. If the carriage position is not at the left margin, a CARR > LM 236 decision block determines whether the carriage position is beyond the left margin. If not, the carriage position must be to the left of the left margin and the carriage position must be adjusted so the margin control subroutine again BRANCHES to a LEFT MARGIN 234 subroutine input. If the carriage position is to the right of a left margin, the subroutine BRANCHES to a TEXT ZONE 238 subroutine input.

Figure 20:
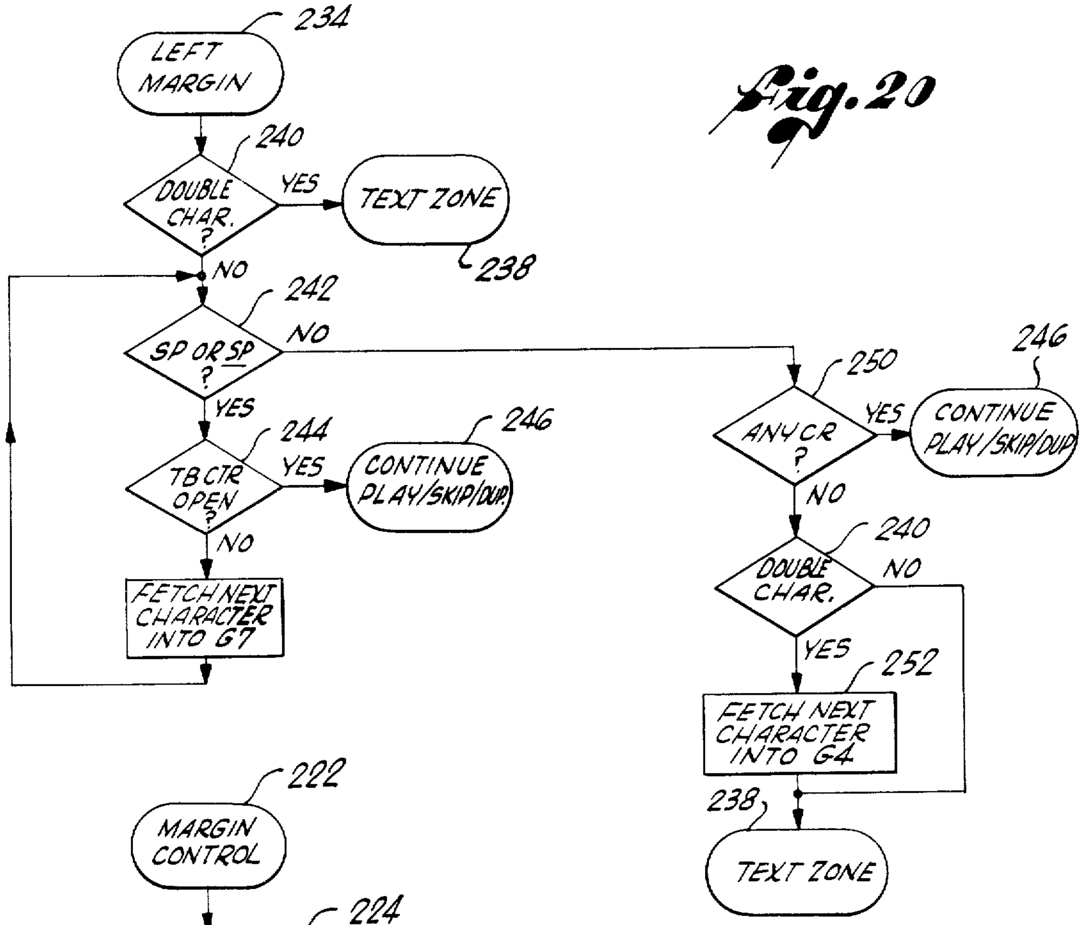
FIG. 20 is a system flow chart for the left margin subroutine.

The LEFT MARGIN 234 subroutine is illustrated in FIG. 20. In the left margin zone, it is first determined whether a double character exists with a DOUBLE CARR 240 decision block. In the input format for the system of the invention, double characters have special significance. For example, a double carriage return signifies the end of a block of paragraph of input text. Therefore, a double character is specially treated at the left margin. If there is no double character, the left margin subroutine BRANCHES immediately to the TEXT ZONE 238 subroutine. If there is a double character, it is next determined whether that character is a space or a back space in a SP or <u>SP</u> 242 decision block. If it is a space or back space, the tab counter condition is examined in a TB CTR OPEN 244 decision block.

If the tab counter is open, the subroutine BRANCHES to a CONTINUE PLAY/SKIP/DUP 246 subroutine. If the tab counter is closed, the next character is examined in a FETCH NEXT CHARACTER INTO G7 248 operation and that character is examined to determine whether it is a space or back space. It should be noted that G7 is the general G register for intermediate storage of characters as they are processed or examined to determine what operation to execute. Thus, if the character at the left margin is a space or back space, and the tab counter is closed, the LEFT MARGIN 234 subroutine examines the data character by character until a non-space character is found. When a character other than a space or back space is found, it is next determined in a ANY CR 250 decision block whether the character is any carriage return and if it is, the left margin subroutine. If the character is not a carriage return, the subsequent characters are examined to see if there is a double character in the DOUBLE CARR 240 decision block. If there is a double character, the second character is stored in a FETCH 2ND CHARACTER INTO G4 252 operation. After the second character is stored or if there is no double character, the LEFT MARGIN 234 subroutine BRANCHES to the TEXT ZONE 238 subroutine.

Figure 21:
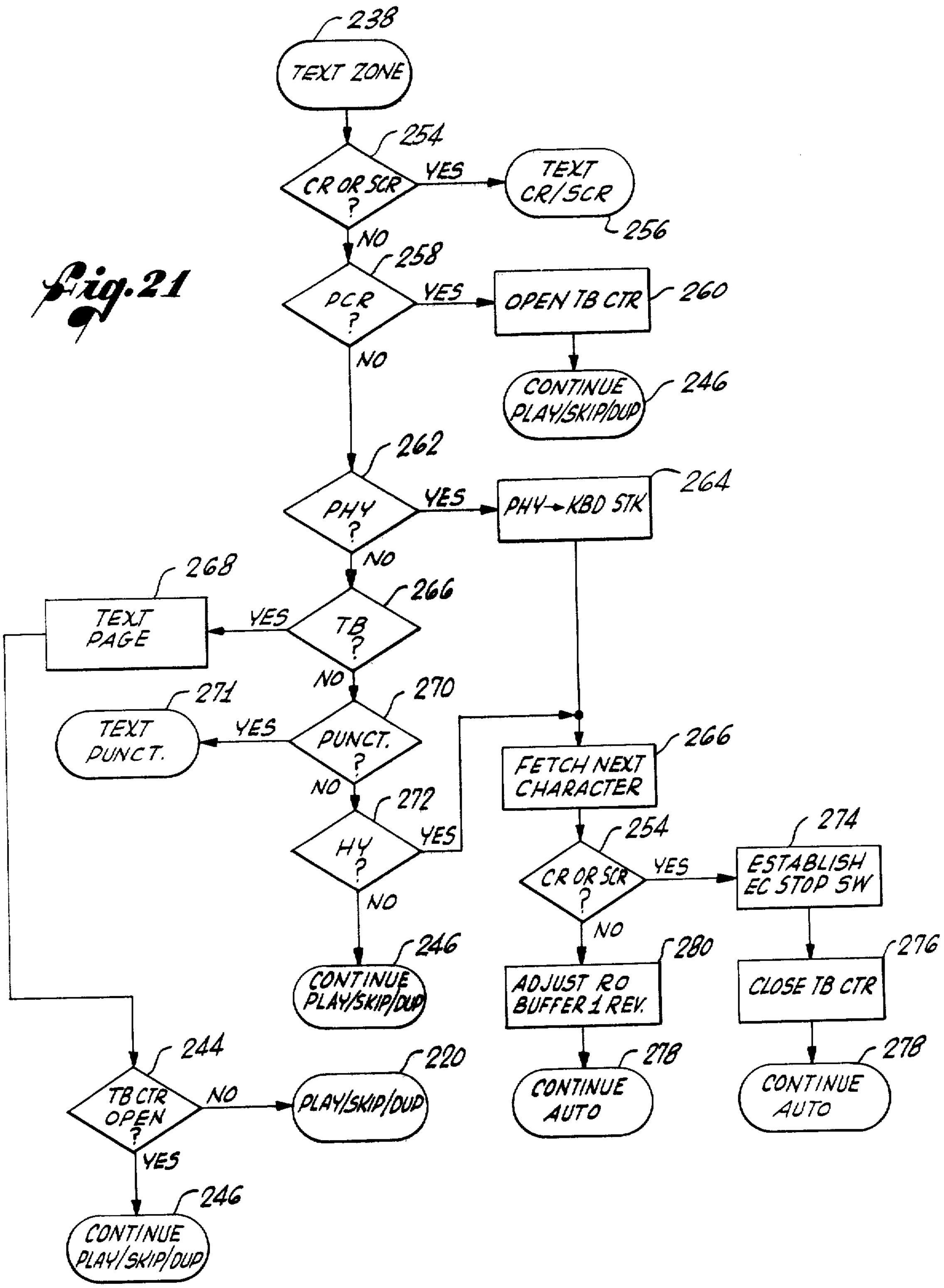
FIG. 21 is a system flow chart for the text zone subroutine.

The TEXT ZONE 238 subroutine is illustrated in FIG. 21. In the text zone, it is first determined whether the character is a carriage return or a special carriage return in a CR OR SCR 254 decision block. If the character is a carriage return or special carriage return, the TEXT ZONE 238 subroutine BRANCHES to a TEXT CR/SCR 256 (FIG. 22) subroutine to determine whether the carriage return is to be executed or not depending upon its position within a line of text. It should be appreciated that a special carriage return is not executed when it is recorded. It is only executed when played back. This permits assembling data such as a business address on one line to conserve paper and playing back the business address with the carriage returns executed to print the address on an envelope or the heading of a letter.

If the character in the text zone is not a carriage return or special carriage return, the character is next examined to determine whether it is a precedented carriage return in a PCR 258 decision block. A precedented carriage return is one which must be executed regardless of the position within a line of text. For example if a new paragraph is to start, a precedented carriage return is executed. If the character is a precedented carriage return, the tab counter is opened in a OPEN TB CTR 260 operation so that a tab can be executed. The TEXT ZONE 238 subroutine then BRANCHES to the CONTINUE PLAY/SKIP/DUP 246 subroutine. If the character is not a precedented carriage return, it is examined to determine whether or not it is a precedented hyphen in a PHY 262 decision block. Again, a precedented hyphen is one which must be executed to properly print a word and is not a hyphen used to end a line of text. If the character is a precedented hyphen, it has to be printed so the character is placed in the keyboard stack in a PHY BD STK 264 operation and the next character is examined by first executing a FETCH NEXT CHARACTER 266 operation.

If the character is not a precedented hyphen, it is determined whether or not it is a tab in a TB 266 decision block and if so, a TEXT PAGE 268 operation is performed to condition the machine to begin printing a new paragraph. In the case of a tab, it is determined if the tab counter is open so a tab can be executed in a TB CTR OPEN 244 decision block and, if so, the routine BRANCHES to the CONTINUE PLAY/SKIP/DUP 246 subroutine. If the tab counter is not open, the routine BRANCHES to the PLAY/SKIP/DUP 220 subroutine to determine the nature of the tab.

If the character is not a tab, it is determined if it is a punctuation character in a PUNCT 270 decision block. If the character is a punctuation character, the subroutine BRANCHES to a TEXT PUNCT subroutine to determine if the punctuation is to be printed. If the character is not a punctuation character, it is determined whether it is an ordinary hyphen in a HY 272 decision block. An ordinary hyphen may or may not be executed depending on whether it was originally recorded to end a line. If the character is a hyphen, the FETCH NEXT CHARACTER 266 operation is next executed. If the character is not a hyphen, it is an ordinary printable character and the subroutine BRANCHES to the CONTINUE PLAY/SKIP/DUP 246 subroutine. If the character is either a precedented hyphen or an ordinary hyphen, following the FETCH NEXT CHARACTER 266 operation that next character is examined to determine whether or not it is a carriage return or special carriage return in a CR OR SCR 254 decision block. If the next character is a carriage return or special carriage return, an ESTABLISH EC STOP SW 274 operation is performed to enable an executive stop. It should be appreciated that a hyphen followed by a carriage return would ordinarily mean the end of a line, and if this combination appears in the middle of a line of text, the combination of hyphen and carriage return should not be executed. Therefore, for such a case, the further execution of that combination is prevented by the ESTABLISH EC STOP SW 274 operation. The tab counter is then closed in a CLOSE TB CTR 276 operation and the subroutine BRANCHES to the CONTINUE AUTO 278 subroutine.

If the next character is not a carriage return or special carriage return, the hyphen is followed by another printable character. And if this occurs in the middle of a line, and the hyphen is not precedented, the hyphen should be eliminated. In such a case, the hyphen is simple eliminated by advancing the buffer by one increment or character thereby bypassing the stored hyphen. Thus, an ADJUST RO BUFFER REV 280 operation is performed and the subroutine then BRANCHES to the CONTINUE AUTO 278 subroutine.

Figure 22:
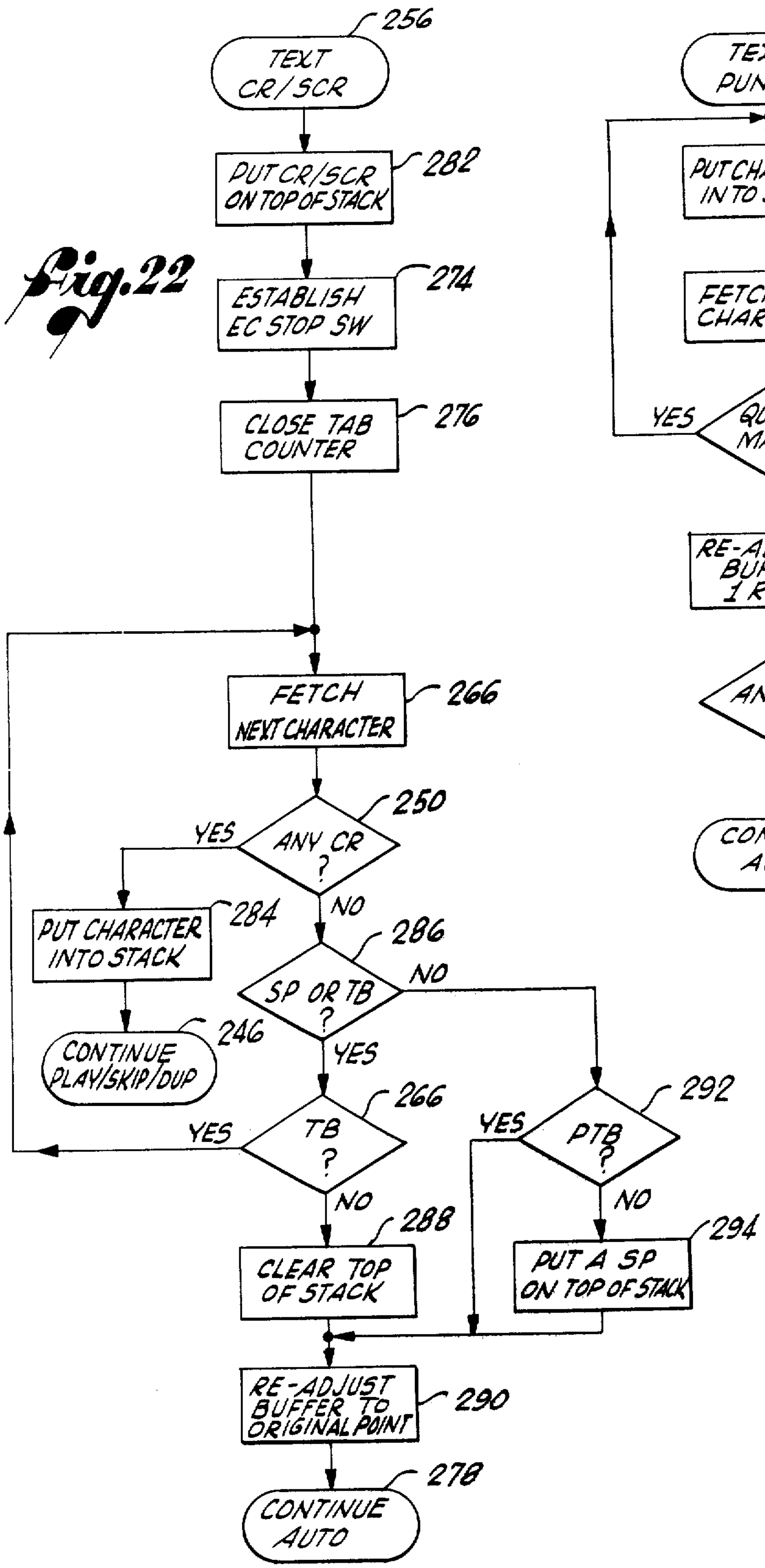
FIG. 22 is a system flow chart for the text carriage return or special carriage return subroutine.

In the TEXT ZONE 238 subroutine, if a carriage return or special carriage return appears, the text zone subroutine BRANCHES to the TEXT CR/SCR 256 subroutine illustrated in FIG. 22. Basically, this subroutine determines what is to be done with that carriage return depending upon what follows that character. Therefore, the character is stored in a PUT CR/SCR ON TOP OF STACK 282 operation and the printing operation of the system is temporarily stopped by the ESTABLISH EC STOP SW 274 operation. The CLOSE TAB COUNTER 276 operation prohibits the execution of a tab. At this point, the characters following the carriage return are examined in order to decide what to do with the carriage return. Therefore, the FETCH NEXT CHARACTER 266 operation is performed and that next character is examined to see if it is a carriage return in the ANY CR 250 decision block. If the next character is a carriage return, the two sequential carriage returns are generally interpreted to mean an end of paragraph and must be executed. Therefore, the character is stored in a PUT CHARACTER INTO STACK 284 operation and a subroutine then BRANCHES to the CONTINUE PLAY/SKIP/DUP 246 subroutine.

If the next character is not a carriage return, it is examined to determine if it is a space or a tab in a SP OR TB 286 decision block. It should be noted that, if a carriage return is followed by a space or tab in any sequence, ordinarily that carriage return should be executed as the following material would normally begin a new paragraph. Therefore, if it is a space or tab, it is then determined if it is a tab in the TB 266 decision block. If it is a tab, the subroutine returns to the FETCH NEXT CHARACTER 266 operation and the following character is examined. If it is a space, indicating a carriage return followed by a space which could be the beginning of a new paragraph, the carriage return and space are to be executed, therefore a CLEAR TOP OF STACK 288 operation is performed to prevent any character in the stack from pre-empting the execution of the carriage return. The storage buffer is then returned to the carriage return character in a RE-ADJUST BUFFER TO ORIGINAL POINT 290 operation and the subroutine then BRANCHES to the CONTINUE AUTO 278 subroutine.

If the next character following the carriage return is not a carriage return, space or tab, it is next determined whether the character is a precedented tab which must be executed in a PTB 292 decision block. If it is a precedented tab, the buffer is adjusted back to the carriage return in the RE-ADJUST BUFFER TO ORIGINAL POINT 290 operation. If it is not a precedented tab, indicating that the character following the carriage return is an ordinary printing character which therefore means that the carriage return was a simple line ending in the original text, then that carriage return will not be executed and replaced by a space in a PUT A SP ON TOP OF STACK 294 operation followed by a re-adjustment of the buffer to the original point in the RE-ADJUST BUFFER TO ORIGINAL POINT 290 operation.

Thus, for the case where a carriage return is followed by another printing character in the middle of the text zone, the carriage return is converted to a space which is placed in the stack. It should be appreciated from the basic IDLE SEQUENCE 160, that characters in the stack are executed before characters in the buffer. Therefore, when the IDLE SEQUENCE 160 is again executed, the stored space in the stack will be executed in place of the carriage return.

Figure 23:
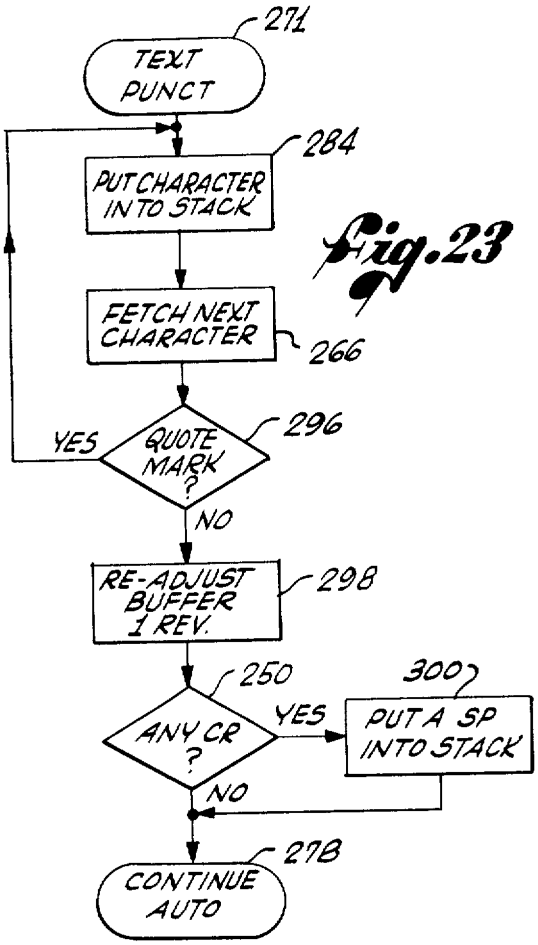
FIG. 23 is a system flow chart of the text-punctuation subroutine.

Another branch in the TEXT ZONE 238 subroutine shown in FIG. 21 is the TEXT PUNCT 271 subroutine for executing punctuations. The TEXT PUNCT 271 subroutine is illustrated in FIG. 23. This subroutine handles the situation where a punctuation mark such as a period is followed by a tab or carriage return. In this case, the punctuation character is executed and the following characters are examined to determine their disposition. Thus, the TEXT PUNCT 271 subroutine first executes the PUT CHARACTER INTO STACK 284 operation and followed by the FETCH NEXT CHARACTER 266 operation. The next character is then examined to determine whether or not it is a qualified tab in a QTB 296 decision block. If the next character is a qualified tab, it is placed into the stack in the PUT CHARACTER INTO STACK 284 operation and the next following character is again examined. If the next character is not a qualified tab, the buffer is readjusted in a RE-ADJUST BUFFER ONE REV 298 operation and the next character is tested to determine whether or not it is a carriage return in the ANY CR 250 decision block. If the next character is not a carriage return, the punctuation is followed by a space in the case of a period or another character in the case of a comma. Both of these situations should print normally so the TEXT PUNCT 271 subroutine BRANCHES to the CONTINUE AUTO 278 subroutine. If the next character is a carriage return, the normal case would be a period followed by a carriage return indicating the end of a line in the original text. When this occurs in the text zone, the carriage return should not be executed. Therefore, a space is substituted for the carriage return in a PUT A SP INTO STACK 300 operation and then the subroutine BRANCHES to the CONTINUE AUTO 278 subroutine.

Figure 24:
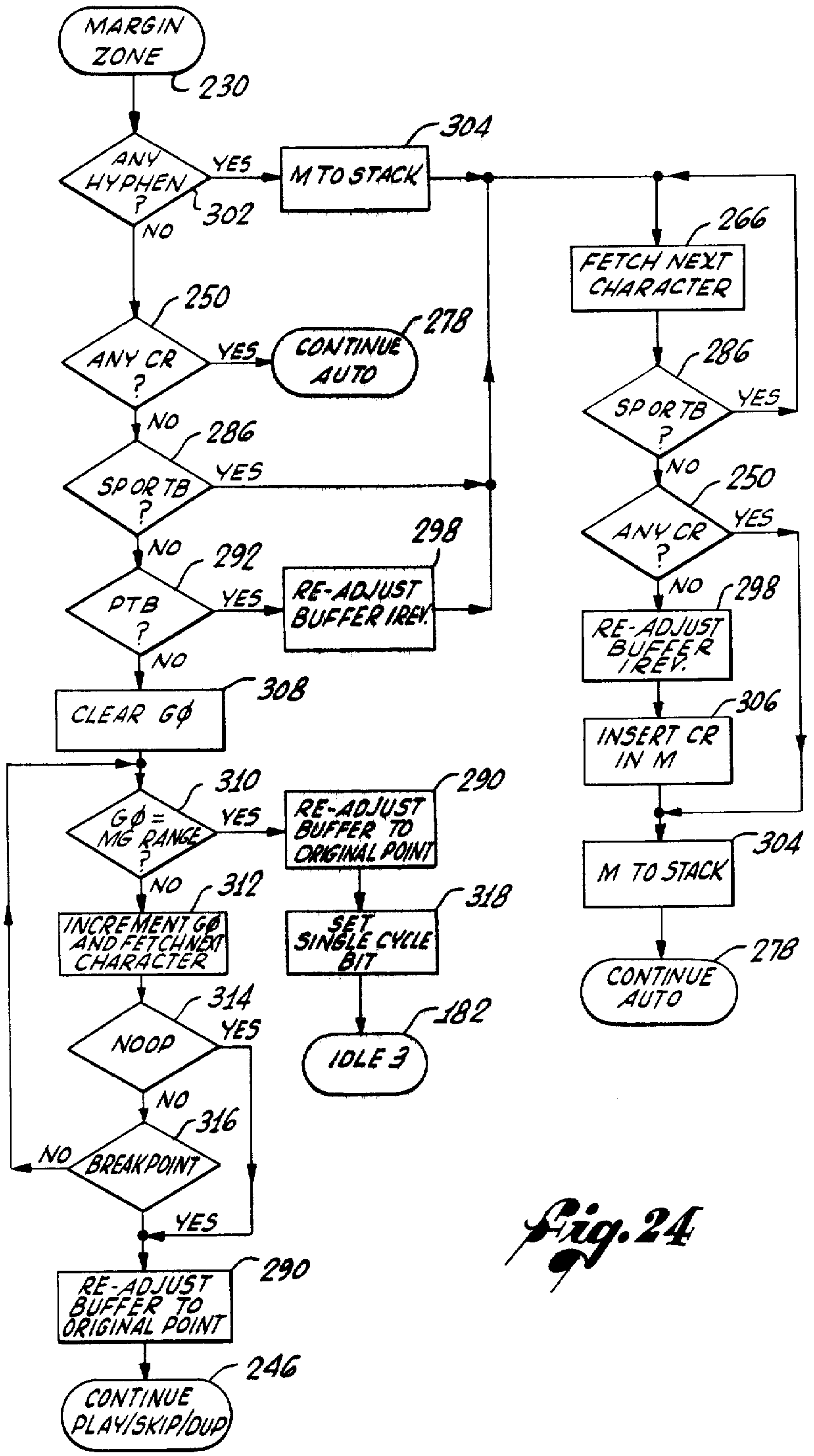
FIG. 24 is a system flow chart of the margin zone subroutine.

The MARGIN ZONE 230 subroutine is illustrated in FIG. 24. As briefly discussed above, when the carriage position enters the right hand margin zone which is a predetermined number of character positions to the left of the pre-set right margin, the MARGIN ZONE 230 subroutine first determines whether the line can be correctly ended in that margin zone. If the line cannot be properly ended, the operation of the word processor is stopped and the operator alerted to the fact that a decision must be made as to how the line is to be ended. Normally this involves a decision on the operator's part as to where to place a hyphen in a word. Following the keyboard entry of a hyphen, a carriage return is automatically executed and the text begins printing again on the following line.

If the combination of characters within the margin zone permits the line to be properly ended, the MARGIN ZONE 230 subroutine conditions the sequence of characters within the margin zone to end the line and return the carriage to the left margin.

In its operation, the MARGIN ZONE 230 subroutine examines character sequences to determine, first of all, if any control characters are present which could possibly be used as a break in the textual material. Therefore, the MARGIN ZONE 230 subroutine begins with a ANY HYPHEN 302 decision block and, if the first character in the margin zone is a hyphen, the contents of the master register 112 are stored in a M TO STACK 304 operation. At this point, the line can properly be ended but it must first be determined whether any adjustments or modifications must be made in the following characters to prevent erroneous printing of the following textural material.

For example, if the hyphen were used to end a line in the original material, the hyphen will be followed by a carriage return so that the original sequence of characters need not be modified. However, if the hyphen was in the middle of a word in the original text, a carriage return must be executed before the original text can be printed. Therefore, the following character is examined in the FETCH NEXT CHARACTER 266 operation followed by the space or tab SP OR TB 286 decision block. If the next character is a space or tab, the FETCH NEXT CHARACTER 266 operation is again performed. Normally, a hyphen will not be followed by a space or tab so the next character is checked to see if it is a carriage return in the ANY CR 250 decision. If it is a carriage return, the character is stored in the stack in the TO STACK 304 operation. It should be appreciated at this point that the stack contains the hyphen and the carriage return and the normal operation of the printing sequence will result in the line being ended by a hyphen followed by a carriage return. As described above, the characters in the stack are executed before a character from the buffers. Thus, the MARGIN ZONE 230 subroutine ends through the CONTINUE AUTO 278 exit.

If the character following the hyphen is not a carriage return, that next character is a printing character and the original sequence was a hyphenated word. Therefore in order to end the line with the hyphen and continue printing the word on the following line, that character must be again retrieved during the normal operation of the processor so the buffer is backspaced by one character in the READJUST BUFFER ONE REV 298 operation. At this point, a carriage return must be executed so a INSERT CR IN M 306 operation is performed followed by the M TO STACK 304 operation which now leaves the hyphen followed by the carriage return in the stack which will be executed in the normal processing sequence so the MARGIN ZONE 230 subroutine returns to the normal printing sequence through the CONTINUE AUTO 278 exit.

If the first character in the margin zone is not a hyphen, the ANY HYPHEN 302 decision at the beginning of the MARGIN ZONE 230 subroutine is negative and the character is checked to see if it is a carriage return in the ANY CR 250 decision block. Again, if the character is a carriage return the line can be ended normally so the MARGIN ZONE 230 subroutine ends through the CONTINUE AUTO 278 exit.

If the character is not a carriage return, it is checked to see if it is a space or tab in the SP OR TB 286 decision block. If the character is a space or tab, the line can be ended following that character provided the next character can be used to begin the following line. Therefore, the following characters are examined as described above through the FETCH NEXT CHARACTER 266 operation again, if a space or tab is encountered indicating two spaces or tabs in a row, those characters are not executed and are eliminated by fetching the next character. If the character following the space or tab is not itself a space or tab and is not a carriage return, it is a printing character and again the buffer is backspaced by one, a carriage return is inserted into the main register and then stored in the stack and the MARGIN ZONE 230 subroutine again returns to the main printing sequence through the CONTINUE AUTO 278 exit. Thus, if the first character in the margin zone is a space or tab, that operation is not executed and a carriage return is inserted into the stack to be executed next.

If the first character in the margin zone is a precedented tab which must be executed, the PTB 292 decision block BRANCHES on YES to the RE-ADJUST BUFFER ONE REV 298 operation to insure that the tab is executed, then again, the following characters are examined to determine whether they need to be skipped in order to properly begin the following line.

If the first character in the margin zone is not a character which could normally be used to end a line such as those discussed above, that first character is a printing character and each successive character within the margin zone must be examined to see if the line will normally end in the margin zone or if the operator will have to determine the position for a hyphen. In this operation, the G0 general purpose register is used to store the count of characters examined for comparison with the preset margin range character count. Therefore, the examination sequence begins with a CLEAR G0 308 operation followed by a comparison of the count in G0 with the margin range in a G0 = MG RANGE 310 decision.

If the count in G0 is not equal to the margin range count, an INCREMENT G0 AND FETCH NEXT CHARACTER 312 operation is performed followed by a check of that next character to see if it is a no operation character in a NOOP 314 decision. If the next character is a no operation character, indicating the end of a recorded line of data in the buffer, the operation of the machine will be halted within the margin range so the character within the margin range can be executed. Therefore, the buffer is backspaced to the beginning of the margin range characters in the RE-ADJUST BUFFER TO ORIGINAL POINT 290 operation and the MARGIN ZONE 230 subroutine BRANCHES to the CONTINUE PLAY/SKIP/DUP 246 subroutine.

If the next character is not a no operation (NOOP) character, it is examined to see if it is a break point character which would end the line. If the character will not end the line, a BREAK POINT 316 decision is NO and the subroutine returns to the comparison of the count in the G0 register with the margin range count. In this manner, each successive character is examined to determine whether or not it will end the line. If one of the successive characters will end the line, the BREAK POINT 316 decision is YES and the buffer is backspaced to the original point and the subroutine BRANCHES to the CONTINUE PLAY/SKIP/DUP 246 subroutine. If all of the characters within the margin range will not end the line, the G0 count will eventually equal the margin range count indicating that the end of the line has been reached. When this occurs, the operator must make a decision as to where to put the hyphen, so the buffer is backspaced to the original point through the RE-ADJUST BUFFER TO ORIGINAL POINT 290 operation and the machine is stopped by the SET SINGLE CYCLE BIT 318 operation which permits only one character at a time to be printed. The MARGIN ZONE 230 subroutine then BRANCHES back to the IDLE SEQUENCE 160 through the IDLE 3 182 exit.

Figures 25, 26:
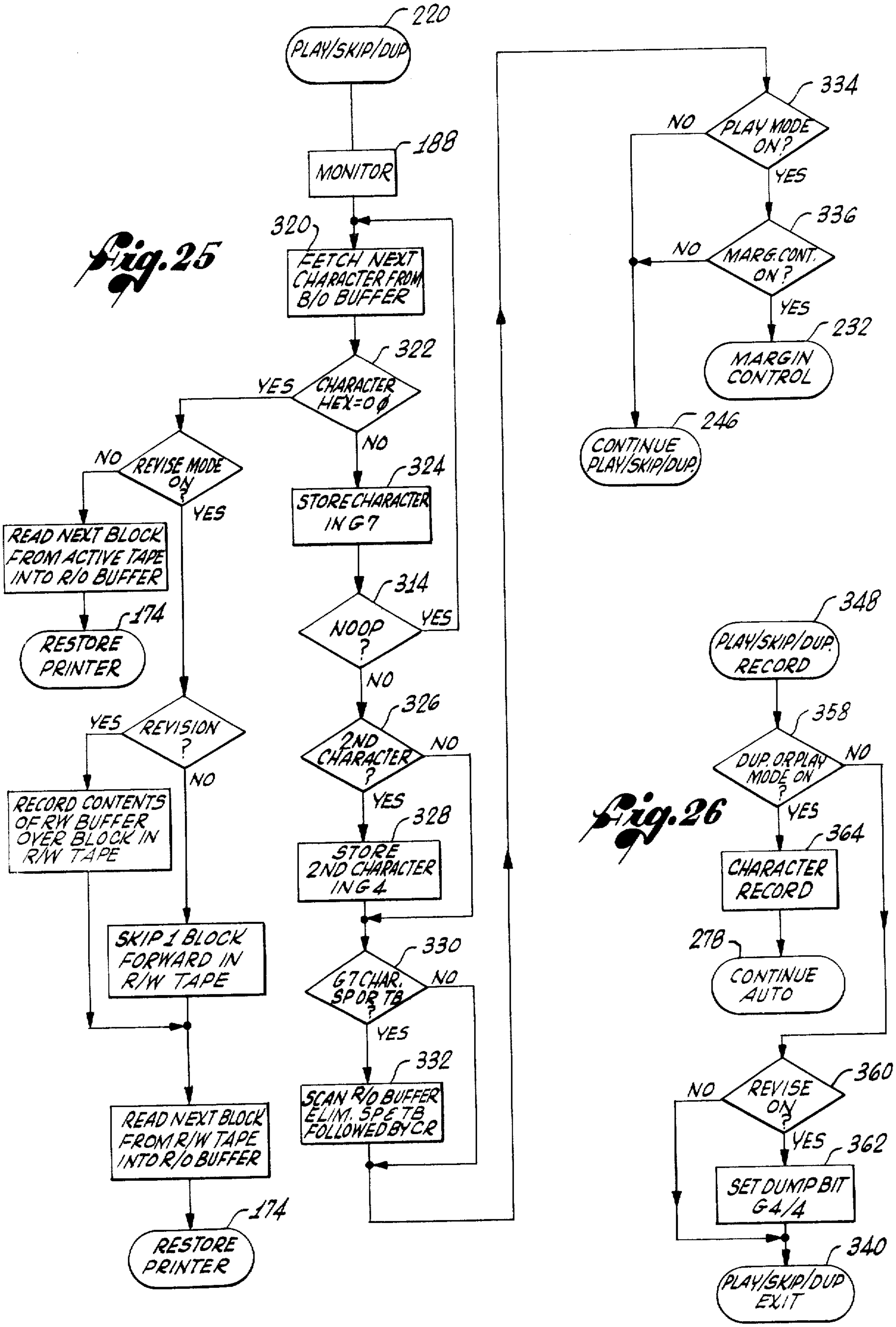
FIG. 25 is a system flow chart of the play/skip/duplicate subroutine.
FIG. 26 is a system flow chart of the play/skip/duplicate record subroutine.

Once it is determined what disposition is to be made of a character, a second major control subroutine is the PLAY/SKIP/DUP 220 routine illustrated in FIG. 25. This subroutine controls the major operations utilized by the operator in playing back and printing the original textural materiaial with modifications.

The PLAY/SKIP/DUP 220 subroutine begins by performing the MONITOR 188 operation to see if other machine conditions must be handled before the PLAY/SKIP/DUP subroutine is executed. If the machine conditions permit the PLAY/SKIP/DUP 220 subroutine to be executed, a FETCH NEXT CHARACTER FROM RO BUFFER 320 operation is performed. The character is then checked to see if it is a special control character indicating the end of the stored characters in the read-only buffer 54 (FIG. 1). The blank characters which make up the fifty extra characters per line are double naughts and are checked in a CHARACTER HEX = FF 322 decision block. If the character is not the end of the contents of the read-only buffer, the character is stored in the G7 general purpose register in a STORE CHARACTER IN G7 324 operation. The character is then checked to see if it is the no operation character in the NOOP 314 decision block. If the character is a no operation character it is ignored and the subroutine returns to the FETCH NEXT CHARACTER FROM RO BUFFER 320 operation. If the character is not the NOOP character it is next determined if there is a following second character in a 2ND CHARACTER 326 decision block and, if there is, the following second character is stored in a STORE 2ND CHARACTER IN G4 328 operation.

If there is no second character, a routine proceeds directly to a check of the first character stored in G7 in a G7 CHAR SP OR TB 330 decision. If the first character is a space or tab, the read-only buffer is scanned and all spaces and tabs are eliminated if they are followed by a carriage return. The scanning is done in a SCAN RO BUFFER ELIM. SP AND TB FOLLOWED BY CR 332 operation. If the first character in G7 is not a space or tab, the scanning operation is bypassed and the PLAY/SKIP/DUP 220 subroutine proceeds to a series of decision blocks to determine what disposition is to be made of the character.

Therefore, a PLAY MODE ON 334 decision block is executed followed by a MARG CONT ON 336 check to see if margin control is on. If play mode is on and margin control is on, the subroutine BRANCHES to the MARGIN CONTROL 222 subroutine previously discussed. If PLAY mode is not on or if margin control is not on, the PLAY/SKIP/DUP 220 BRANCHES to the CONTINUE PLAY/SKIP/DUP 246 subroutine.

Figure 27:
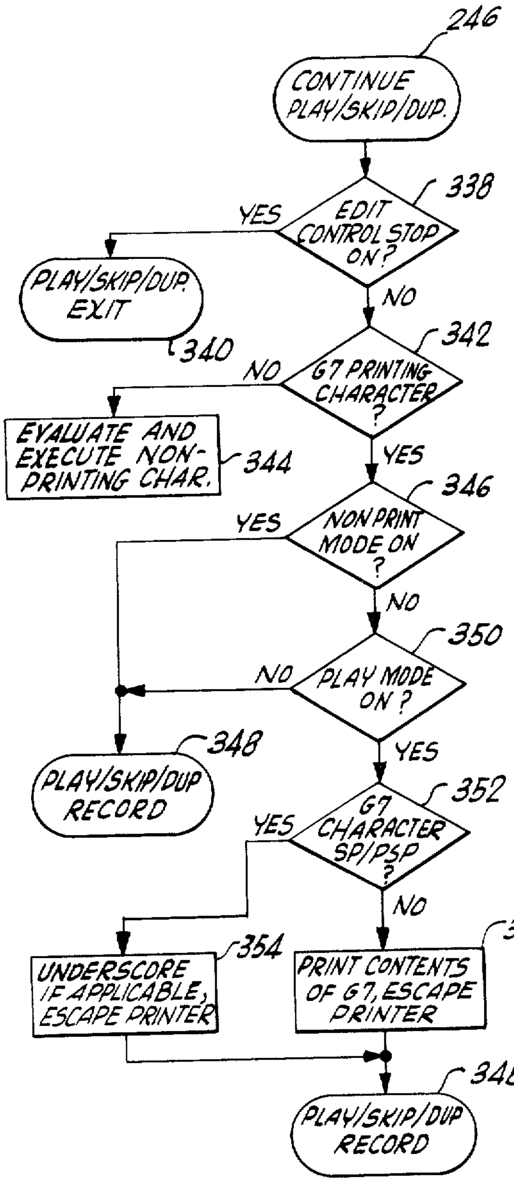
FIG. 27 is a system flow chart of the continue play/-skip/duplicate subroutine.

The CONTINUE PLAY/SKIP/DUP 246 subroutine is illustrated in FIG. 27. It should be noted that the CONTINUE PLAY/SKIP/DUP 246 subroutine is entered through numerous other subroutines such as the MARGIN CONTROL 222 subroutine and the TEXT ZONE 238 subroutine. The CONTINUE PLAY/SKIP/DUP 246 subroutine proceeds with a number of decisions to determine the disposal of the character. Thus, if the edit control is on, the EDIT CONTROL STOP ON 338 decision block causes a BRANCH of the subroutine to the PLAY/SKIP/DUP EXIT 340 subroutine illustrated in FIG. 28. If edit control is not on, the character in G7 is checked to see if it can be printed in a G7 PRINTING CHARACTER 342 decision block. If the character is not to be printed, an EVALUATE AND EXECUTE NON-PRINTING CHARACTER 344 operation is performed to cause the particular function to be executed by the printer. If G7 is a printing character, it is determined if the character is to be printed in a NON-PRINT MODE ON 346 decision block and if the character is not to be printed the CONTINUE PLAY/SKIP/DUP 246 subroutine BRANCHES to the PLAY/SKIP/DUP RECORD 348 subroutine illustrated in FIG. 26. If the character is to be printed it is next determined if PLAY mode is on in a PLAY MODE ON 350 decision block. Again, if PLAY mode is not on, the subroutine branches to the PLAY/SKIP/DUP RECORD 348 subroutine. If PLAY mode is on, it is next determined whether the character is a space or precedented space in a G7 CHARACTER SP/PSP 352 decision block. If so, an AN ESCAPE PRINTER 354 operation is performed followed by a BRANCHING of the subroutine to the PLAY/SKIP/DUP RECORD 348 subroutine. If the character is not a space or a backspace a PRINT CONTENTS OF G7, ESCAPE PRINTER 356 subroutine is performed again followed by a BRANCHING to the PLAY/SKIP/DUP RECORD 348 subroutine.

The PLAY/SKIP/DUP RECORD 348 subroutine is illustrated in FIG. 26. It is first determined whether the duplicate or play mode is on in a DUP OR PLAY MODE ON 358 decision block and if neither mode is on, it is next determined if REVISE mode is on in a REVISE ON 360 decision block. If none of the three modes is on, the subroutine BRANCHES to the PLAY/SKIP/DUP EXIT 340 subroutine illustrated in FIG. 28. If REVISE mode is on, a SET DUMP BIT G4/4 362 operation is performed to condition the machine to revise the data in the buffer. The subroutine then proceeds to the PLAY/SKIP/DUP EXIT 340 subroutine.

IF DUPLICATE or PLAY mode is on, a CHARACTER RECORD 364 operation is performed to record the character in the read-write buffer 52. The subroutine then BRANCHES to the CONTINUE AUTO 278 subroutine.

Figure 28:
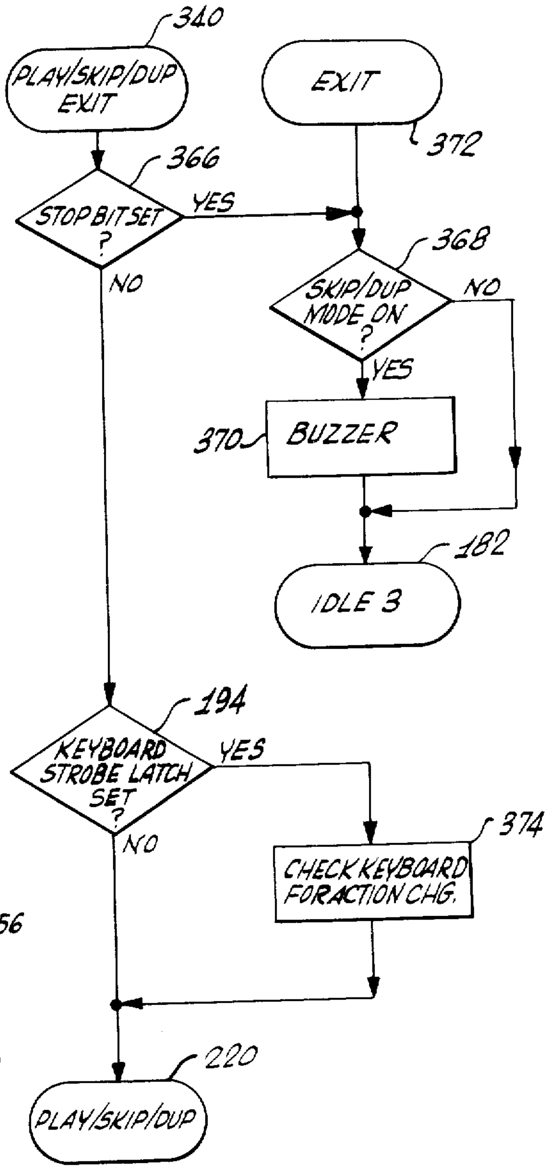
FIG. 28 is a system flow chart of the play/skip/duplicate subroutine.

The PLAY/SKIP/DUP EXIT 340 subroutine is illustrated in FIG. 28. It is first determined if the stop bit is set in a STOP BIT 366 decision block. If the stop bit is set it is determined if the SKIP or DUP mode is on in a SKIP/DUP MODE ON 368 decision block. If the stop bit is set and either the SKIP or DUPLICATE mode is on, the machine cannot operate correctly and an ERROR BUZZER 370 operation is performed to alert the operator to this condition. The subroutine then BRANCHES to the IDLE 3 182 exit to the IDLE SEQUENCE 160. If a stop bit is set and SKIP or DUPLICATE mode is not on, the PLAY/SKIP/DUP EXIT 340 subroutine BRANCHES directly to the IDLE 3 EXIT 182. The EXIT 372 subroutine begins with a direct check if the SKIP or DUPLICATE mode is on.

If the stop bit is not set, it is determined if the keyborad 60 has a character ready for entry into the processor. Therefore the KEYBOARD STROBE LATCH SET 194 decision block results in a scanning of the keyboard for a change in machine commands in a CHECK KEYBOARD FOR ACTION CHANGE 374 operation prior to returning to the PLAY/SKIP/DUP 220 subroutine. If the keyboard strobe latch is not set, the PLAY/SKIP/DUP EXIT 34 subroutine proceeds directly to the PLAY/SKIP/DUP 220 subroutine.

NON-PRINTED APPENDICES APPEARING IN SUBJECT PATENTED FILE

Appendix A is a program listing showing the ROM addresses and resulting control instruction words for a presently preferred best mode for the word processing system of the present invention.

Appendix B is an electrical schematic diagram of the keyboard interface of the preferred embodiment of the invention with labeled input and output signals for communicating with other circuit diagrams described below.

Appendix C is an electrical schematic diagram of the printer interface of the preferred embodiment of the described system.

Appendix D is an electrical schematic diagram of a keyboard control circuit for use in the preferred embodiment of the described system.

Appendix E is an electrical schematic diagram of the ROM addressing circuits used in the described system.

Appendix F is an electrical schematic diagram of the ROM circuits used in the system.

Appendix G is an electrical schematic diagram of the circuits of the Arithmetic Logic Unit used in the described system.

Appendix H is an electrical schematic diagram of the Return Address Stack used in the described system.

Appendix I is an electrical schematic diagram of the General Purpose Registers used in the system.

Appendices J through Q are electrical schematic diagrams of auxiliary circuitry needed for the operation of the described system.

It should be noted that all circuitry is constructed with integrated circuits available from Texas Instruments, Inc., Dallas, Texas and are labeled with Texas Instruments' part numbers. Descriptions of those circuit elements may be found in "The Intergrated Circuits Catalog" published by Texas Instruments, Inc., particularly the first edition (CC-401) and other subsequent editions.

While a presently preferred embodiment of the word processing system of the automatic word processing system of the present invention has been described in detail, it should be appreciated that the invention is not to be limited except by the following claims.

I claim:

1. A microprocessor which communicates with a plurality of peripheral devices via a data bus and an instruction word bus, said microprocessor having a read-only-memory (hereinafter abbreviated ROM) which generates a plurality of instruction words on said instruction word bus in response to a corresponding ROM address, said microprocessor including an arithmetic logic unit (hereinafter abbreviated ALU) for performing arithmetic and logic functions, said microprocessor further including a plurality of addressable general purpose data storage registers, each of said instruction words being applied in parallel to said peripheral devices, said ROM, said ALU and said general purpose registers, said combination comprising:

means for addressing said peripheral devices, means within each of said peripheral devices which is responsive to said means for addressing and is further responsive to instruction words transmitted over said instruction word bus to effect a predetermined operation when a control command is specified by said instruction words and to provide a status condition when a status check command is specified by said instruction words, means responsive to said status condition to specify a predetermined succeeding ROM address to be applied to said ROM, means within said ALU and said general purpose data storage registers responsive to instruction words to effect a predetermined data processing operation on data transmitted over said data bus from said peripheral devices when a data processing command is specified by said instruction words and to provide a test condition result when a test data command is specified by said instruction words, means responsive to said instruction words for determining which general purpose register will have its contents processed by said ALU and means responsive to said test condition result to specify a predetermined succeeding ROM address to be applied to said ROM.

2. A microprocessor as defined in claim 1 further including means responsive to instruction words to test for the presence of blank characters in data in said general purpose data storage registers.

3. A microprocessor as defined in claim 1 further including means responsive to instruction words to effect a predetermined comparison between characters permanently stored within said ROM and data characters received for said peripheral devices, and means responsive to results of said comparison to effect a predetermined processing (arithmetic or logic) function upon said data characters received from said peripheral devices.

4. A microprocessor as defined in claim 3 further including means responsive to instruction word to test for the presence of blank characters in data in said general purpose data registers.

5. A microprocessor as defined in claim 1 further including means within each of said peripheral devices which is responsive to instruction words to effect an idle or no operation condition of said peripheral devices.

6. A microprocessor as defined in claim 1 further including means within said ALU, said general purpose data storage registers and said peripheral devices, responsive to instruction words to receive data from an external source and to effect a predetermined operation upon said external data.

7. A microprocessor as defined in claim 6 further including means within each of said peripheral devices which is responsive to instruction words to effect an idle or no operation condition of said peripheral devices.

8. A microprocessor as defined in claim 7 further including means responsive to instruction words to test for the presence of blank characters in data in said general purpose data storage registers.

9. A microprocessor as defined in claim 8 further including means responsive to instruction words to effect a predetermined comparison between characters permanently stored within said ROM and data characters received from said peripheral devices, and means responsive to results of said comparison to effect a predetermined processing (arithmetic or logic) function upon said data characters received from said peripheral devices.

10. A microprocessor as defined in claim 1 further including means within said ALU and said general purople data storage registers responsive to instruction words to effect a predetermined logical functional operation or an arithmetic function operation on data from said peripheral devices, means within said ALU responsive to said instruction words for performing a carry operation in said arithmetic function operation, and means responsive to said instruction words to prevent data from being transferred from said ROM.

11. A microprocessor as defined in claim 1 further including means within each of said peripheral devices responsive to instruction words to provide a status condition on a particular one of a plurality of peripheral status conditions to be tested.

12. A microprocessor as defined in claim 11 further including means within said ALU and said general purpose data storage registers responsive to instruction words to effect a predetermined logical functional operation or an arithmetic function operation on data from said peripheral devices, means within said ALU responsive to said instruction words for performing a carry operation in said arithmetic function operation, and means responsive to said instruction words to prevent data from being transferred from said ROM.

* * * * *